United States Patent
Bandoh et al.

(10) Patent No.: US 11,930,833 B2
(45) Date of Patent: Mar. 19, 2024

(54) PROCESS FOR MAINTAINING FRESHNESS OF VEGETABLE PIECES

(71) Applicant: Kraft Foods Group Brands LLC, Chicago, IL (US)

(72) Inventors: Kwaku Bandoh, Round Lake, IL (US); Rachel Catherine Brown, Evanston, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 31 days.

(21) Appl. No.: 16/010,229

(22) Filed: Jun. 15, 2018

(65) Prior Publication Data
US 2018/0289049 A1    Oct. 11, 2018

Related U.S. Application Data

(63) Continuation of application No. 15/432,875, filed on Feb. 14, 2017, now abandoned.

(51) Int. Cl.
*A23L 19/12* (2016.01)
*A23B 7/04* (2006.01)
(Continued)

(52) U.S. Cl.
CPC ............... *A23L 19/12* (2016.08); *A23B 7/04* (2013.01); *A23B 7/045* (2013.01); *A23B 7/06* (2013.01);
(Continued)

(58) Field of Classification Search
None
See application file for complete search history.

(56) References Cited

U.S. PATENT DOCUMENTS

| 1,083,259 A | 12/1913 | Kitsee |
| 2,206,209 A | 7/1940 | Thorn |

(Continued)

FOREIGN PATENT DOCUMENTS

| CN | 101715807 | 6/2010 |
| CN | 103907845 | 7/2014 |

(Continued)

OTHER PUBLICATIONS

WHF: Worlds Healthiest Foods: What is Acrylimide . . . ; published online at least by Sep. 30, 2011 at: https://web.archive.org/web/20110930134511/http://www.whfoods.com/genpage.php?tname=george&dbid=260 (Year: 2011).*

(Continued)

*Primary Examiner* — Patricia A George
(74) *Attorney, Agent, or Firm* — Fitch, Even, Tabin & Flannery LLP

(57) ABSTRACT

A packaged food product and methods of making and using it. In some embodiments. The packaged food product may comprise a cup containing multiple ingredients in sealed pouches suitable for use in making an omelet or other egg-based entrées, with the cup being suitable for microwave cooking of an egg-based entrée. The ingredients may include vegetable components that offer organoleptic properties similar to those of fresh vegetables after an extended period of time. Ideally, time required for processing, shipment, storage, etc., which may be, e.g., several weeks, may pass without unacceptable degradation of taste, texture, mouth feel, flavor, aroma, color, nutritional content or other important qualities. In some embodiments, the ingredients may also include additional components, such as, for example, one or more meats, and/or one or more varieties of cheese.

12 Claims, 11 Drawing Sheets

(51) Int. Cl.

| | |
|---|---|
| *A23B 7/045* | (2006.01) |
| *A23B 7/06* | (2006.01) |
| *A23B 7/10* | (2006.01) |
| *A23B 7/154* | (2006.01) |
| *A23L 3/015* | (2006.01) |
| *A23L 3/3418* | (2006.01) |
| *A23L 3/3508* | (2006.01) |
| *A23L 5/10* | (2016.01) |
| *A23L 19/00* | (2016.01) |
| *B65B 25/04* | (2006.01) |
| *B65B 29/08* | (2006.01) |
| *B65D 77/04* | (2006.01) |
| *B65D 77/24* | (2006.01) |
| *B65D 81/32* | (2006.01) |
| *B65D 81/34* | (2006.01) |

(52) U.S. Cl.
CPC ............ *A23B 7/10* (2013.01); *A23B 7/154* (2013.01); *A23L 3/0155* (2013.01); *A23L 3/3418* (2013.01); *A23L 3/3508* (2013.01); *A23L 5/13* (2016.08); *A23L 19/03* (2016.08); *B65B 25/041* (2013.01); *B65B 29/08* (2013.01); *B65D 77/04* (2013.01); *B65D 77/24* (2013.01); *B65D 81/3233* (2013.01); *B65D 81/3453* (2013.01); *A23V 2002/00* (2013.01); *B65B 2220/14* (2013.01); *B65B 2220/18* (2013.01); *B65D 2581/3425* (2013.01)

(56) References Cited

U.S. PATENT DOCUMENTS

| | | | |
|---|---|---|---|
| 2,206,210 A | 7/1940 | Thurman | |
| 2,462,733 A | 2/1949 | Easley | |
| 2,705,679 A * | 4/1955 | Griffiths | A23P 30/38 |
| | | | 426/445 |
| 3,474,877 A | 10/1969 | Wesener | |
| 3,547,658 A | 12/1970 | Melnick | |
| 3,958,035 A | 5/1976 | Stearns | |
| 4,027,456 A * | 6/1977 | Wilson | B65B 31/04 |
| | | | 53/434 |
| 4,133,996 A | 1/1979 | Fread | |
| 4,140,801 A * | 2/1979 | Hilton | A23L 19/19 |
| | | | 426/49 |
| 4,910,036 A | 3/1990 | Rapp | |
| 4,990,735 A | 2/1991 | Lorenson | |
| 5,518,747 A | 5/1996 | Pike | |
| 5,607,712 A * | 3/1997 | Bourne | A23B 7/0056 |
| | | | 426/321 |
| 5,674,546 A | 10/1997 | Barnes | |
| 5,718,933 A | 2/1998 | Fultz | |
| 5,807,597 A | 9/1998 | Barnes | |
| 5,817,355 A | 10/1998 | Zukerman | |
| 5,904,946 A | 5/1999 | Kemp | |
| 5,922,381 A | 7/1999 | Bajracharya | |
| 5,925,394 A | 7/1999 | Levinson | |
| 5,932,276 A | 8/1999 | Bhatia | |
| 5,961,872 A | 10/1999 | Simon | |
| 6,033,701 A | 3/2000 | Hirsch | |
| 6,033,705 A | 3/2000 | Isaacs | |
| 6,099,883 A | 8/2000 | Colomban | |
| 6,106,775 A | 8/2000 | Fuller | |
| 6,123,968 A | 9/2000 | Mendez | |
| 6,132,786 A | 10/2000 | Poulos | |
| 6,146,675 A | 11/2000 | Cirigliano | |
| 6,175,105 B1 | 1/2001 | Rubbright | |
| 6,207,210 B1 | 3/2001 | Bender | |
| 6,224,930 B1 * | 5/2001 | Inglis | A23L 3/3409 |
| | | | 426/320 |
| 6,265,006 B1 | 7/2001 | Inglis | |
| 6,287,610 B1 | 9/2001 | Bowling | |
| 6,329,004 B1 | 12/2001 | Fernandez | |
| 6,372,220 B1 | 4/2002 | Shukla | |
| 6,569,474 B2 | 5/2003 | Clayton | |
| 6,602,531 B2 | 8/2003 | Naka | |
| 6,620,446 B2 | 9/2003 | King | |
| 6,713,105 B1 | 3/2004 | Bekele | |
| 6,730,345 B2 | 5/2004 | Khairullah | |
| 6,814,999 B2 | 11/2004 | Knipper | |
| 6,818,873 B2 | 11/2004 | Savage | |
| 6,821,548 B1 | 11/2004 | Buwalda | |
| 6,824,802 B2 | 11/2004 | Bautista | |
| 6,896,919 B2 | 5/2005 | Wright | |
| 6,903,320 B2 | 6/2005 | Cutler | |
| 7,001,632 B2 | 2/2006 | Nauth | |
| 7,015,442 B2 * | 3/2006 | Tucker, Jr. | B65D 81/3461 |
| | | | 219/725 |
| 7,026,007 B2 | 4/2006 | Domazakis | |
| 7,074,447 B2 | 7/2006 | Bonaventura | |
| 7,163,709 B2 | 1/2007 | Cook | |
| 7,192,618 B2 | 3/2007 | Cummins | |
| 7,205,517 B2 | 4/2007 | Hoh | |
| 7,208,188 B2 | 4/2007 | Sakuma | |
| 7,226,630 B2 | 6/2007 | Loh | |
| 7,312,272 B2 | 12/2007 | Jakob | |
| 7,338,681 B2 | 3/2008 | Merkle | |
| 7,396,551 B2 | 7/2008 | Ghorpade | |
| 7,550,166 B2 | 6/2009 | Caselli | |
| 7,595,073 B2 | 9/2009 | Baldwin | |
| 7,678,401 B2 | 3/2010 | Panaioli | |
| 7,820,216 B1 | 10/2010 | Gavin | |
| 7,833,562 B2 | 11/2010 | Ball | |
| 7,855,351 B2 | 12/2010 | Policappelli | |
| 7,858,137 B2 | 12/2010 | Zheng | |
| 7,887,867 B2 | 2/2011 | Abboud | |
| 7,939,786 B2 | 5/2011 | Edwards | |
| 7,951,411 B2 | 5/2011 | Merkle | |
| 8,006,513 B2 | 8/2011 | Roth | |
| 8,080,502 B2 | 12/2011 | Herdt | |
| 8,101,219 B2 | 1/2012 | Halpern | |
| 8,206,771 B2 | 6/2012 | Caro | |
| 8,211,488 B2 | 7/2012 | Merkle | |
| 8,323,673 B2 | 12/2012 | Compadre | |
| 8,372,460 B2 | 2/2013 | Meyers | |
| 8,409,644 B2 | 4/2013 | Martin | |
| 8,425,962 B2 | 4/2013 | Palleschi | |
| 8,470,383 B2 | 6/2013 | Rasanayagam | |
| 8,486,468 B2 | 7/2013 | Asger | |
| 8,486,480 B2 | 7/2013 | Van Krieken | |
| 8,512,781 B2 | 8/2013 | Ricks | |
| 8,613,249 B2 | 12/2013 | France | |
| 8,697,422 B2 | 4/2014 | Stahnke | |
| 8,778,429 B2 | 7/2014 | Halpern | |
| 8,834,952 B2 | 9/2014 | Merkle | |
| 8,866,056 B2 | 10/2014 | Shapiro | |
| 8,956,673 B2 | 2/2015 | Alvarado | |
| 9,060,523 B1 | 6/2015 | Buller-Colthurst | |
| 9,405,014 B2 | 8/2016 | Kawamoto | |
| 2001/0001674 A1 | 5/2001 | Simpson | |
| 2002/0041920 A1 | 4/2002 | Fernandez | |
| 2002/0094363 A1 | 7/2002 | Traeder | |
| 2002/0106435 A1 | 8/2002 | Fish | |
| 2003/0055010 A1 | 3/2003 | De Haan | |
| 2003/0057217 A1 | 3/2003 | Wyslotsky | |
| 2003/0087015 A1 * | 5/2003 | Wyslotsky | A23B 7/148 |
| | | | 426/397 |
| 2003/0087017 A1 | 5/2003 | Hanselmann | |
| 2003/0118714 A1 | 6/2003 | Merkle | |
| 2003/0138533 A1 | 7/2003 | Simmons | |
| 2003/0194479 A1 | 10/2003 | Takeuchi | |
| 2003/0229011 A1 | 12/2003 | Braun | |
| 2004/0043130 A1 | 3/2004 | Thomas | |
| 2004/0043922 A1 | 3/2004 | Naidu | |
| 2004/0058038 A1 | 3/2004 | Lee | |
| 2004/0058041 A1 | 3/2004 | Greenwald | |
| 2004/0112786 A1 | 6/2004 | Takami | |
| 2004/0156960 A1 | 8/2004 | Villota | |
| 2004/0161517 A1 | 8/2004 | Winniczuk | |
| 2004/0191382 A1 | 9/2004 | Cooper | |
| 2004/0213765 A1 | 10/2004 | Fischetti | |
| 2004/0234659 A1 | 11/2004 | Linton | |
| 2005/0042341 A1 | 2/2005 | Thomas | |

(56) References Cited

U.S. PATENT DOCUMENTS

| | | |
|---|---|---|
| 2005/0058751 A1 | 3/2005 | Brotsky |
| 2005/0095318 A1 | 5/2005 | Schwenninger |
| 2005/0106292 A1 | 5/2005 | Huber |
| 2005/0136157 A1 | 6/2005 | Ebihara |
| 2005/0175745 A1 | 8/2005 | Zawistowski |
| 2005/0186311 A1 | 8/2005 | Loh |
| 2005/0186312 A1 | 8/2005 | Loh |
| 2005/0196492 A1 | 9/2005 | Muller |
| 2005/0215638 A1 | 9/2005 | Kemp |
| 2005/0221029 A1 | 10/2005 | Cater |
| 2005/0226974 A1 | 10/2005 | Faragher |
| 2005/0287256 A1 | 12/2005 | Parker |
| 2006/0024412 A1 | 2/2006 | Cha |
| 2006/0024414 A1 | 2/2006 | Turek |
| 2006/0034981 A1 | 2/2006 | Pan |
| 2006/0127540 A1 | 6/2006 | Keckeis |
| 2006/0151533 A1 | 7/2006 | Simunovic |
| 2006/0159813 A1 | 7/2006 | Ming |
| 2006/0198931 A1 | 9/2006 | Neto |
| 2006/0257535 A1 | 11/2006 | Cornforth |
| 2006/0257539 A1 | 11/2006 | Zheng |
| 2006/0286226 A1 | 12/2006 | Hong |
| 2007/0020364 A1 | 1/2007 | Burnett |
| 2007/0020365 A1 | 1/2007 | Herdt |
| 2007/0031543 A1 | 2/2007 | Huber |
| 2007/0042184 A1 | 2/2007 | Coyne |
| 2007/0054010 A1 | 3/2007 | Kalum |
| 2007/0077335 A1 | 4/2007 | Bouraoui |
| 2007/0104809 A1 | 5/2007 | Coyne |
| 2007/0128295 A1 | 6/2007 | Kennedy |
| 2007/0131679 A1 | 6/2007 | Edwards |
| 2007/0148306 A1 | 6/2007 | Mattson |
| 2007/0212461 A1 | 9/2007 | Lillevang |
| 2007/0237671 A1 | 10/2007 | Yuan |
| 2007/0237865 A1 | 10/2007 | Love |
| 2007/0264398 A1 | 11/2007 | Cummins |
| 2007/0298150 A1 | 12/2007 | Simmons |
| 2008/0038440 A1* | 2/2008 | Delpierre ............. A23C 19/09 426/582 |
| 2008/0050507 A1 | 2/2008 | Jaehnert |
| 2008/0057163 A1 | 3/2008 | Kegler |
| 2008/0138473 A1 | 6/2008 | Pawlick |
| 2008/0145496 A1 | 6/2008 | Cooper |
| 2008/0145497 A1 | 6/2008 | Loh |
| 2008/0152757 A1 | 6/2008 | Zheng |
| 2008/0233242 A1 | 9/2008 | Zhang |
| 2008/0317912 A1 | 12/2008 | Keller |
| 2009/0022858 A1 | 1/2009 | Pawlick |
| 2009/0045095 A1 | 2/2009 | Wagner |
| 2009/0074915 A1 | 3/2009 | Hendriksen |
| 2009/0111894 A1 | 4/2009 | Bos |
| 2009/0169650 A1 | 7/2009 | Wilkes |
| 2009/0263547 A1 | 10/2009 | Dutaut |
| 2009/0311394 A1 | 12/2009 | Kirchner |
| 2009/0324795 A1 | 12/2009 | Dieter |
| 2010/0040734 A1 | 2/2010 | Nakamura |
| 2010/0092420 A1 | 4/2010 | Miret Carceller |
| 2010/0174001 A1 | 7/2010 | Kowalczyk |
| 2010/0197812 A1 | 8/2010 | Nahas |
| 2010/0260900 A1 | 10/2010 | DeVerney |
| 2010/0282636 A1 | 11/2010 | Roberts |
| 2010/0284985 A1 | 11/2010 | Mygind |
| 2011/0028550 A1 | 2/2011 | Campano |
| 2011/0038995 A1 | 2/2011 | Thulin |
| 2011/0091618 A1 | 4/2011 | Wang |
| 2011/0123693 A1 | 5/2011 | Egana |
| 2011/0129575 A1 | 6/2011 | Li |
| 2011/0159158 A1 | 6/2011 | Penna |
| 2011/0195163 A1 | 8/2011 | Krawczyk |
| 2011/0204046 A1 | 8/2011 | Middleton |
| 2011/0250323 A1 | 10/2011 | Martin |
| 2011/0268849 A1 | 11/2011 | Dixon |
| 2011/0318471 A1 | 12/2011 | Anand |
| 2012/0009308 A1 | 1/2012 | Keller |
| 2012/0064217 A1 | 3/2012 | Hofing |
| 2012/0070549 A1 | 3/2012 | Gutzmann |
| 2012/0070866 A1 | 3/2012 | Gu |
| 2012/0129936 A1 | 5/2012 | Herdt |
| 2012/0207892 A1 | 8/2012 | Joseph |
| 2012/0219689 A1 | 8/2012 | Mansson |
| 2012/0225942 A1 | 9/2012 | Stockel |
| 2012/0231142 A1 | 9/2012 | Lucak |
| 2012/0251700 A1 | 10/2012 | Hofing |
| 2012/0288593 A1 | 11/2012 | Halpern |
| 2013/0064953 A1 | 3/2013 | Bache |
| 2013/0074455 A1 | 3/2013 | Gillblad |
| 2013/0078339 A1 | 3/2013 | Trahan |
| 2013/0136832 A1 | 5/2013 | Sawyer |
| 2013/0171306 A1 | 7/2013 | Berndt Briceno |
| 2013/0171314 A1 | 7/2013 | Campano |
| 2013/0183420 A1 | 7/2013 | Shimek |
| 2013/0230633 A1 | 9/2013 | Palleschi |
| 2013/0266699 A1 | 10/2013 | Middis |
| 2013/0283736 A1 | 10/2013 | VanLoocke |
| 2013/0284726 A1 | 10/2013 | Edwards |
| 2013/0287918 A1 | 10/2013 | Fischer |
| 2013/0309379 A1 | 11/2013 | van Rijn |
| 2013/0327763 A1 | 12/2013 | Persells |
| 2013/0337122 A1 | 12/2013 | Falquerho |
| 2014/0010766 A1 | 1/2014 | Sleigh |
| 2014/0057029 A1 | 2/2014 | Klerken |
| 2014/0065285 A1 | 3/2014 | Alden |
| 2014/0079727 A1 | 3/2014 | Loessner |
| 2014/0093620 A1 | 4/2014 | Chang |
| 2014/0113058 A1 | 4/2014 | Adachi |
| 2014/0127359 A1 | 5/2014 | Akerman |
| 2014/0220213 A1 | 8/2014 | Braithwaite |
| 2014/0231419 A1 | 8/2014 | Vadlamani |
| 2014/0248398 A1 | 9/2014 | Pickford |
| 2014/0298752 A1 | 10/2014 | Keller |
| 2014/0308402 A1 | 10/2014 | Girard |
| 2014/0323572 A1 | 10/2014 | Pimentel |
| 2014/0341872 A1 | 11/2014 | Ware |
| 2014/0356497 A1 | 12/2014 | Dodd |
| 2015/0031762 A1 | 1/2015 | Pimentel |
| 2015/0044337 A1 | 2/2015 | Keller |
| 2015/0064334 A1 | 3/2015 | Alden |
| 2015/0072063 A1 | 3/2015 | Merkle |
| 2015/0079247 A1 | 3/2015 | Merkle |
| 2015/0118371 A1* | 4/2015 | Velasco ............. A23B 7/0433 426/248 |
| 2015/0140186 A1 | 5/2015 | Sliekers |
| 2015/0166241 A1 | 6/2015 | Huffman |
| 2015/0239612 A1 | 8/2015 | Wang |
| 2015/0289529 A1 | 10/2015 | Carreira |
| 2015/0353261 A1 | 12/2015 | Gupta |
| 2016/0050966 A1 | 2/2016 | Ohmiya |
| 2016/0058061 A1 | 3/2016 | Drury |
| 2016/0100588 A1 | 4/2016 | Thomas |
| 2016/0102069 A1 | 4/2016 | Adam |
| 2016/0114962 A1 | 4/2016 | Parsons |
| 2016/0174600 A1 | 6/2016 | Moon |
| 2017/0245528 A1 | 8/2017 | Hirschey |
| 2018/0229915 A1 | 8/2018 | Brown |
| 2018/0289049 A1 | 10/2018 | Bandoh |
| 2019/0159493 A1 | 5/2019 | Mathey |
| 2019/0300257 A1 | 10/2019 | Rolli |

FOREIGN PATENT DOCUMENTS

| | | |
|---|---|---|
| CN | 104351320 | 2/2015 |
| EP | 3028582 | 6/2016 |
| FR | 2536251 | 5/1984 |
| JP | H01273540 | 11/1989 |
| JP | H03183436 | 8/1991 |
| JP | H04352657 | 12/1992 |
| JP | H07147892 | 6/1995 |
| JP | H0856625 | 3/1996 |
| JP | 10225377 | 8/1998 |
| JP | 2000062857 | 2/2000 |
| KR | 101550965 | 9/2015 |

(56) References Cited

OTHER PUBLICATIONS

Pedreschi: Reduction of acrylamide formation in potato slices during frying; LWT—Food Science and Technology vol. 37, Issue 6, Sep. 2004, pp. 679-685. (Year: 2004).*
Yaldigard: The principles of ultra high pressure technology and its application in food processing/preservation . . . ; African Journal of Biotechnology vol. 7 (16), pp. 2739-2767, Aug. 18, 2008. (Year: 2008).*
Wiki: Wikipedia: List of culinary knife cuts; published online at least by Mar. 13, 2015 at: https://web.archive.org/web/20150313145732/https://en.wikipedia.org/wiki/List_of_culinary_knife_cuts (Year: 2015).*
Delishar: Steamed Cabbage Rolls; published online on Dec. 4, 2015 at: http://delishar.com/2015/12/steamed-cabbage-rolls.html (Year: 2015).*
Recipe Tips: RecipeTips.com; Why Fruits and Vegetables Turn Brown; published online at least by Feb. 3, 2016 at: https://web.archive.org/web/20160203202005/https://www.recipetips.com/kitchen-tips/t--945/why-fruits-and-vegetables-turn-brown.asp (Year: 2016).*
Pick Your Own: Master List of Typical pH and Acid Content of Fruits and Vegetables . . . ; published online at least by Jan. 3, 2016 at: https://web.archive.org/web/20160103134720/http://www.pickyourown.org/ph_of_fruits_and_vegetables_list.htm (Year: 2016).*
Rovere: HPP strawberry products _9 an example of processing line: © 1996 Elsevier Science B.V.. (Year: 1996).*
Juliot: Directly-Acidified Carrot Slices . . . ; Journal of Food Science—vol. 54, No. 1, 1989. (Year: 1989).*
Patent Cooperation Treaty, International Search Report and Written Opinion received in International Application No. PCT/US2017/068677, dated Mar. 16, 2018, 14 pages.
"Cold Pasteurization of Milk", International Dairy Magazine, 9 2016, international-dairy.com (3 pgs.).
Alex L. Brandt et al. "Inhibition of Listeria monocytogenes by Food Antimicrobials Applied Singly and in Combination".
Anonymous: "Prepared Vegetables for Steamed Shiitake Egg", Aug. 2015.
Anonymous:"Leafy Greens Mix-In for Scrambled Eggs, Omelets & Frittatas", Feb. 2016.
Ates, Mehmet Baris, et al., "Modeling of Listeria monocytogenes inactivation by combined high-pressure and mild-temperature treatments in model soup", European Food Reseach & Technology (2016) (10 pgs.).
Ayana, Belgizar, et al., "Edible Films/Coatings Containing Antimicrobial Agent and Their Applications in Food Packaging", The Journal of Food, GIDA (2010) 35 (2): 151-158 (9 pgs.).
Aymerich, T., al., "Decontamination technologies for meat products", Meat Science 78 (2008) 114-129, www.elsevier.com/locate/meatsci (16 pgs.).
Bae, Yun Young, et al., "Application of Supercritical Carbon Dioxide for Microorganism Reductions in Fresh Pork", Journal of Food Safety 31 (2011) 511-517, ISSN 174-4656 (7 pgs.).
Baguley, David, "Innovations in Meat and Dairy Processing", Food Magazine, Mar. 2007 (4 pgs.).
Balaguer, Mari Pau, et al., "Antifungal properties of gliadin films incorporating cinnamaldehyde and application in active food packaging of bread and cheese spread foodstuffs", International Journal of Food Microbiology 166 (2013) 369-377, www.elsevier.com/locate/ijfoodmicro (9 pgs.).
Balciunas, Eduardo Marcos, et al., "Novel biotechnological applications of bacteriocins: A review", Food Control 32 (2013) 134-142 (9 pgs.).
Batmaz, Ediz, et al., "Integration of ResonantAcoustic mixing into thermal processing of foods: A comparison study against other in-container sterilization technologies", Journal of food Enineering 165 (2015) 124-132 (9 pgs.).
Berry, Donna, "Discretion Prevents Separation", Dairy Foods, Apr. 2007 (3 pgs.).
Brandt, Alex L., et al., "Inhibition of Listeria monocytogenes by Food Antimicrobials Applied Singly and in Combination", Food Microbiology & Safety, Journal of Food Science, vol. 75, Nr. 9, 2010 (8 pgs.).
Burgos, María Jose Grande, et al., "The Cyclic Antibacterial Peptide Enterocin AS-48: Isolation, Mode of Action, and Possible Food Applications", International Journal of Molecular Sciences 2014, 15, 22706-22727 (22 pgs.).
Burris, Kellie P., et al., "Antimicrobial Activity of Yerba Mate (Ilex paraguariensis) Aqueous Extracts against *Escherichia coli* O157:H7 and *Staphylococcus aureus*", Jurnal of Food Science, vol. 7 N. 6, 2011, M456-M462 (7 pgs.).
Chung, Yoon-Kyung, et al., "Inactivation of Barotolerant Listeria monocytogenes in Sausage by Combination of High-Pressure Processing and Food-Grade Additives", International Association for Food Protection, Journal of Food Protection, vol. 68, No. 4, 2005, pp. 744-750 (7 pgs.).
Coutinho De Oliveira, Thales Leandro, et al., "Inhibitory activity of Syzygium aromaticum and Cymbopogon citratus (DC.) Stapf. essential oils against Listeria monocytogenes inoculated in bovine ground meat", Brazilian Journal of Microbiology 44, 2, 357-365 (2013) (9 pgs.).
Del Rosario Moreira, Maria, et al., Antimicrobial Effectiveness of Bioactive Packaging Materials from Edible Chitosan and Casein Polymers: Assessment on Carrot, Cheese, and Salami, Journal of Food Science, vol. 76, Nr. 1, 2011 (11 pgs.).
Dolezalova, M., et al,. "Effect of Organic Acids on Growth of Chilled Chicken Skin Microflora", Journal of Food Safety 30 (2010) 353-365 (14 pgs.).
Doosh, Kifah S., et al., "Effect of Lysozyme Isolated From Hen Egg White in Elongation the Shelf Life of Iraqi Soft Cheese Made from Buffalo Milk", Pakistan Journal of Nutrition 13 (11): 635-641, 2014 (8 pgs.).
Dubie, Jeremiah, et al. "Antioxidant Extraction from Mustard (*Brassica juncea*) Seed Meal Using High-Intensity Ultrasound", Journal of Food Sciece, vol. 78, NR 4, 2013, E542-E548 (8 pgs.).
Duthie, Garry, et al., "Antioxidant Effectiveness of Vegetable Powders on the Lipid and Protein Oxidative Stability of Cooked Turkey Meat Patties: Implications for Health", Nutrients 2013, 5, 1241-1252; doi:10.3390/nu5041241, www.mdpi.com/journal/nutrients (13 pgs.).
Falcone, Pasquale M., et al., "Evaluating In Vitro Antimicrobial Activity of Thymol toward Hygiene-Indicating and Pathogenic Bacteria", Journal of Food Protection, vol. 70, No. 2, 2007, pp. 425-431 (7 pgs.).
Ghani, A.G. Abdul, et al., "Numerical simulation of solid-liquid food mixture in a high pressure processing unit using computational fluid dynamics", Journal of Food Engineering 80 (2007) 1031-1042, www.elsevier.com/locate/jfoodeng (12 pgs.).
Guinane, C.M., et al., "Microbial solutions to microbial problems; lactococcal bacteriocins for the control of undesirable biota in food", Journal of Applied Microbiology 2005, 98, 1316-1325 (11 pgs.).
Guo, Mingming, et al., "Antimicrobial films and coatings for inactivation of Listeria innocua on ready-to-eat deli turkey meat", Food Control 40 (2014) 64-70 (7 pgs.).
Hailemariam, Gebrehana A., et al. "Antioxidant Activity and Preservative Effect of Thyme (Thymus schimperi R.)", British Journal of Applied Science & Technology 3(4): 131-1326, 2013 (17 pgs.).
Higgins, Kevin T., "New Age Pasteurization". Food Processing Magazine, Aug. 2016, www.foodprocessing.com (6 pgs.).
Hussein, Emad I., et al., "Evaluation of Food Preservatives, Low Toxicity Chemicals, Liquid Fractions of Plant Extracts and their Combinations as Alternative Options for Controlling Citrus Postharvest Green and Blue Moulds in vitro", Research Journal of Medicinal Plant 6 (8): 551-573, 2012, ISSN 1819-3455 (24 pgs.).
Jofre, Anna, et al., "Application of enterocins A and B, sakacin K and nisin to extend the safe shelf-life of pressurized ready-to-eat meat products", European Food Res earch & Technology (2008) 228:159-162 (5 pgs.).
Jofre, Anna, et al., "Inhibition of *Salmonella* sp. Listeria monocytogenes and *Staphylococcus aureus* in cooked ham by combining antimicrobials, high hydrostatic pressure and refrigeration", Meat Science 78 (2008) 53-59, www.elsevier.com/locate/meatsci (7 pgs.).
Johnson, Jim, "Study Points to Potential for Recycled Content in Hot-fill Bottles" Plastics News, Oct. 3, 2016, vol. 28 Issue 29, p0020-0020.1p (2 pgs.).

(56) References Cited

OTHER PUBLICATIONS

Juliano, Pablo, et al., "Descriptive Analysis of Precooked Egg Products After High- Pressure Processing Combined With Low and High Temperatures", Journal of Food Quality 29 (2006) 505-530 (27 pgs.).
Kiziltas, Selin, et al., "Simulation of heat transfer for solid-liquid food mixtures in cans and model validation under pasteurization conditions", Journal of Food Engineering 97 (2010) 449-456 (8 pgs.).
Kumar, B. Rajesh, et al., "Studies on Processing and Shelf Life of Pork Nuggets with Liquid Whey as a Replacer for Added Water", American Journal of Food Technology 2 (1): 38-43, 2007 (7 pgs.).
Lahmer, Rabya A., et al., "Antibacterial action of chitosan-arginine against *Escherichia coli* O157 in chicken juice", FoodControl 26 (2012) 206-211 (6 pgs.).
Lerasle, M., et al., "Combined use of modified atmosphere packaging and high pressure to extend the shelf-life of raw poultry sausage", Innovative Food Science and Emerging Technologies 23 (2014) 54-60 (7 pgs.).
Lim, G.O., et al., "Application of Gelidium corneum Edible Films Containing Carvacrol for Ham Packages", Journal of Food Science, vol. 75, Nr. 1, 2010 (5 pgs.).
Mataragas, Marios, et al., "Evaluation of the Listeria monocytogenes inactivation during postprocess storage of fermented sausages: A basis for the development of a decision support tool", Food Control 50 (2015) 568-573 (6 pgs.).
Mogensen, Jesper M., et al., "Effect of temperature and water activity on the production of fumonisins by Aspergillus niger and different *Fusarium* species", BioMed Microbiology, Dec. 31, 2009, http://www.biomedcentral.com/1471-2180/9/281 (13 pgs.).
Munoz, R., et al., "Inhibition of Mycotoxin-Producing Aspergillus nomius VSC 23 by Lactic Acid Bacteria and *Saccharomyces cerevisiae*", Brazilian Journal of Microbiology (2010) 41: 1019-1026 (8 pgs.).
Nemeth, Csaba, et al., "Effect of high pressure treatment on liquid whole egg†", High Pressure Research vol. 32, No. 2, Jun. 2012, 330-336 (8 pgs.).
Pan, Hao, et al., "Effect of Process Temperature on Virus Inactivation during High Hydrostatic Pressure Processing of Contaminated Fruit Puree and Juice", Journal of Food Protection, vol. 79, No. 9, 2016, 1517-1526 (10 pgs.).
Patent Cooperation Treaty, International Search Report and Written Opinion received in International Application No. PCT/US2017/068676, Feb. 23, 2018, 15 pages.
Patent Cooperation Treaty, International Search Report and Written Opinion received in International Application No. PCT/US2017/068677, Mar. 16, 2018, 4 pages.
Pattanayaiying, Rinrada, et al., "Incorporation of nisin Z and lauric arginate into pullulan films to inhibit foodborne pathogens associated with fresh and ready-to-eat muscle foods", International Journal of Food Microbiology 207 (2015) 77-82, www.elsevier.com/locate/ijfoodmicro (6 pgs.).
Rao, Qinchun, et al., "Accelerated shelf-life testing of quality loss for a commercial hydrolysed hen egg white powder", Food Chemistry 135 (2012 )464-472 (9 pgs.).
Rastogi, N. K., et al., "Opportunities and Challenges in High Pressure Processing of Foods", Critical Reviews in Food Science and Nutrition, 47:1, 69-112, DOI: 10.1080/10408390600626420, http://dx.doi.org/10.1080/10408390600626420 (45 pgs.).
Robertson, Rosalind E., et al., "Bacillus Spore Inactivation Differences after Combined Mild Temperature and High Pressure Processing Using Two Pressurizing Fluids", Journal of Food Protection, vol. 71, No. 6, 2008, pp. 1186-1192 (7 pgs.).
Romanazzi, Gianfranco, et al., "Shelf life extension of fresh fruit and vegetables by chitosan treatment", Critical Reviews in Food Science and Nutrition, 57:3, 579-601, DOI: 10.1080/10408398.2014.900474 (24 pgs.).
Rossini, Karina, et al., "Casein peptides with inhibitory activity on lipid oxidation in beef homogenates and mechanically deboned poultry meat", LWT—Food Scient and Technology 42 (2009) 862-867 (6 pgs.).
Sharafati-Chaleshtori, R., et al., "Use of Tarragon (Artemisia dracunculus) essential oil as a nat ural preservative in beef burger", Italian Journal of Food Science, vol. 26-2014, 427-432 (7 pgs.).
Singh, Preeti, et al., "The use of carbon dioxide in the processing and packaging of milk and dairy products: A review", International Jounal of Dairy Technology, vol. 65, No. 2, May 2012 (18 pgs.).
Singh, Shiv, et al., "Effect of Hurdle Technology in Food Preservation: A Review", Food Science and Nutrition, 56:541-649 (2016) (10 pgs.).
Somkuti, George A., et al., "Enzymatic fragmentation of the antimicrobial peptides casocidin and isracidin by *Streptococcus thermophilus* and *Lactobacillus delbrueckii* ssp. bulgaricus", Applied Microbiology & Biotechnology (2010) 87:235-242 (9 pgs.).
Takahashi, Hajime, et al., "Growth inhibition effects of ferulic acid and glycine/sodium acetate on Listeria monocytogenes in coleslaw and egg salad", Food Control 57 (2015) 105-109 (5 pgs.).
Tavakoli, Hamid Reza, et al., Antimicrobial Activities of the Combined Use of Cuminum Cyminum L. Essential Oil, Nisin and Storage Temperature Against *Salmonella typhimurium* and *Staphylococcus aureus* In Vitro, Jundishapur J Microbiol. Apr. 2015; 8(4): e24838 (7 pgs.).
Temelli, Seran, et al., "Determination of microbiological contamination sources during Turkish white cheese production", Food Control 17 (2006) 856-861, www.elsevier.com/locate/foodcont (6 pgs.).
Tokusoglu, Ozlem, "Effect of High Hydrostatic Pressure Processing Strategies on Retention of Antioxidant Phenolic Bioactives in Foods and Beverages—a Review", Pol. J. Food Nutr. Sci., 2016, vol. 66, No. 4, pp. 243-251. http://journal.pan.olsztyn.pl (10 pgs.).
Tornuk, Fatih, et al., "LLDPE based food packaging incorporated with nanoclays grafted with bioactive compounds to extend shelf life of some meat products", LWT—Foo Scince and Technology 64 (2015) 540-546 (7 pgs.).
Vodnar, Dan Christian, et al., "Antimicrobial Efficiency of Edible Films in Food Industry", Not Bot Hori Agrobo, 2015, 43(2):302-312 (11 pgs.).
Wojciak, Karolina M. et al., "Use of Acid Whey and Probiotic Strains to Improve Microbiological Quality and Sensory Acceptance of Organic Fermented Sausage", Journal of Food Processing and Preservation (2015) , 539-547 (10 pgs.).
Zardetto, Stefano, et al. "Effect of Different Industrial Pasteurization Conditions on Physicochemical Properties of Egg-Filled Pasta", Journal of Food Process Engineering 38 (2015) 374-384, ISSN 1745-4530 (12 pgs.).
CleverFoodies. All Natural Mix-ins for Fast and Delicious Scrambled Eggs, Omelets and Frittatas. Mar. 22, 2016, Retrieved from URL:<https://web.archive.org/web/20160322090102/http://www.cleverfoodies.com>, 5 pages.
College Recipe Cafe, "Coffee Mug Ham and Cheese Omelet:Microwave Monday." Dec. 8, 2014, Retrieved from: <https://web.archive.org/web/20091009132237/http://allrecipes.com.au/recipe/441/easiest-ever-microwave-omelette.aspx>, 16 pages.
Packaging World. "Easy-Prep Warm Dog Food in PP Cup." Feb. 14, 2014, Retrieved from: <https://www.packworld.com/article/package-feature/cookability/microwavable/easy-prep-warm-dog-food-pp-cup>, 6 pages.

\* cited by examiner

Formula - Ascorbic Acid Media

| Ingredient | % | g |
|---|---|---|
| Ascorbic Acid | 2.00 | 2.00 |
| Sugar | 3.00 | 3.00 |
| Distilled Water | 95.00 | 95.00 |
|  | 100.00 | 100.00 |

Fig. 11

Formula - Citric Acid Media

| Ingredient | % | g |
|---|---|---|
| Citric Acid | 2.00 | 2.00 |
| Sugar | 3.00 | 3.00 |
| Distilled Water | 95.00 | 95.00 |
|  | 100.00 | 100.00 |

Fig. 12

Acid Media (pH)

|  | pH | pH | pH | Ave. pH |  |
|---|---|---|---|---|---|
| Ascorbic Acid Media | 2.67 | 2.67 | 2.68 | 2.67 | Day 1 |
|  | 2.65 |  |  |  | Day 2 |
| Citric Acid Media | 2.17 | 2.18 | 2.16 | 2.17 | Day 1 |
|  | 2.13 |  |  |  | Day 2 |

Fig. 13

| Fresh Veggie Blend (Red Pepper, Green Peppers, Onion) | | | | | |
|---|---|---|---|---|---|
| Blend Puree (pH) | 5.26 |  |  |  |  |
|  | 5.23 |  |  |  |  |
|  | 5.20 |  |  |  |  |
| Average pH | 5.23 |  |  |  |  |

Fig. 14

| Veggie Blend Acidification | | | | | | | |
|---|---|---|---|---|---|---|---|
| | Veggie Blend Wt | | Post Acidification pH (Blend Puree) | | | | |
| | Pre-Wt (g) | Post-Wt (g) | pH | pH | pH | Ave.pH | Time (min) |
| Ascorbic Acid (A) | 100.00 | 104.90 | 4.33 | 4.32 | 4.31 | 4.32 | 11.5 |
| Citric Acid (C) | 100.00 | 105.60 | 3.67 | 3.68 | 3.69 | 3.68 | 25.0 |

Fig. 15

| Acid Pick Up | | |
|---|---|---|
| A | 4.90 | % |
| C | 5.60 | % |

Fig. 16

Formula - Ascorbic Acid Media

| Ingredient | % | g |
|---|---|---|
| Ascorbic Acid | 2.00 | 32.00 |
| Sugar | 3.00 | 48.00 |
| Distilled Water | 95.00 | 1520.00 |
| | 100.00 | 1600.00 |

Fig. 17

Formula - Citric Acid Media

| Ingredient | % | g |
|---|---|---|
| Citric Acid | 2.00 | 32.00 |
| Sugar | 3.00 | 48.00 |
| Distilled Water | 95.00 | 1520.00 |
| | 100.00 | 1600.00 |

Fig. 18

Formula - pHase Acid Media

| Ingredient | % | g |
|---|---|---|
| pHase Acid | 2.00 | 32.00 |
| Sugar | 3.00 | 48.00 |
| Distilled Water | 95.00 | 1520.00 |
| | 100.00 | 1600.00 |

Fig. 19

| Acid Media (pH) | | | | |
|---|---|---|---|---|
| | pH | pH | pH | Ave. pH |
| Ascorbic Acid Media | 2.76 | 2.76 | 2.76 | 2.76 |
| Citric Acid Media | 2.23 | 2.23 | 2.23 | 2.23 |
| Phase Acid Media | 1.37 | 1.35 | 1.33 | 1.35 |

Fig. 20

| Fresh Veggie Blend (Red Pepper, Green Peppers, Onions) | | | | |
|---|---|---|---|---|
| Blend Puree (pH) | 5.00 | | | |
| | 4.99 | | | |
| | 5.00 | | | |
| Average pH | 5.00 | | | |

Fig. 21

| Acid Pick Up | | |
|---|---|---|
| A | 4.83 | % |
| C | 4.03 | % |
| P | 3.30 | % |

Fig. 23

| Veggie Blend Acidification (Dwell Time - 25 mins) | | | | | | |
|---|---|---|---|---|---|---|
| | Veggie Blend Wt | | Post Acidification pH (Blend Puree) | | | |
| | Pre-Wt (g) | Post-Wt (g) | pH | pH | pH | Ave. pH |
| Ascorbic Acid (A) | 1015.00 | 1064.00 | 4.41 | 4.40 | 4.40 | 4.40 |
| Citric Acid (C) | 1015.00 | 1055.90 | 3.98 | 3.95 | 3.96 | 3.96 |
| Phase Acid (P) | 1015.00 | 1048.50 | 2.72 | 2.79 | 2.78 | 2.76 |

Fig. 22

Formula - Citric Acid Media

| Ingredient | % | g |
|---|---|---|
| Citric Acid | 2.00 | 20.00 |
| Sugar | 3.00 | 30.00 |
| Distilled Water | 95.00 | 950.00 |
| | 100.00 | 1000.00 |

Batch Size 1000

Fig. 24

Formula - Citric Acid Media

| Ingredient | % | g |
|---|---|---|
| Citric Acid | 1.50 | 15.00 |
| Sugar | 3.00 | 30.00 |
| Distilled Water | 95.50 | 955.00 |
|  | 100.00 | 1000.00 |

Fig. 25

Formula - Citric Acid Media

| Ingredient | % | g |
|---|---|---|
| Citric Acid | 1.00 | 10.00 |
| Sugar | 3.00 | 30.00 |
| Distilled Water | 96.00 | 960.00 |
|  | 100.00 | 1000.00 |

Fig. 26

| Acid Media (pH) | | | | |
|---|---|---|---|---|
|  | pH | pH | pH | Ave. pH |
| Citric Acid Soln (2%) | 1.99 | 1.98 | 1.98 | 1.98 |
|  |  |  |  |  |
| Citric Acid Soln (1.5%) | 2.07 | 2.07 | 2.07 | 2.07 |
|  |  |  |  |  |
| Citric Acid Soln (1.0%) | 2.18 | 2.18 | 2.18 | 2.18 |

Fig. 27

| Veggie Blend Acidification (Dwell Time - 2 mins) | | | | | | |
|---|---|---|---|---|---|---|
|  |  |  | Post Acidification pH (Blend puree) | | | |
|  |  |  | pH | pH | pH | Ave. pH |
| Citric Acid (2.0%) |  |  | 4.05 | 4.06 | 4.06 | 4.06 |
| Citric Acid (1.5%) |  |  | 4.20 | 4.21 | 4.21 | 4.21 |
| Citric Acid (1.0%) |  |  | 4.31 | 4.33 | 4.32 | 4.32 |

Fig. 28

PROCESS FOR MAINTAINING FRESHNESS OF VEGETABLE PIECES

FIELD

This application relates generally to food products, and more specifically to microwavable food products that include vegetable components, and processes for maintaining freshness of vegetable components.

BACKGROUND

Omelets and scrambled egg items that include meats and vegetables are often prepared by manually dicing meat ingredients and fresh vegetables. Such processes tend to be labor-intensive, and often result in leftover portions of various ingredients requiring storage for later use, or being wasted. A packaged food product comprising components suitable for making one or more individual omelets or other egg-based entrées has been thought to be useful. However, development of a high quality, nutritious product suitable for high-volume commercial production and sale has proven challenging. In addition to addressing problems generally applicable to development and production of packaged food products, e.g., cost control, quality control, shelf-stability, avoidance of unduly high mass or volume of packaging materials, etc., provision of vegetable items suitable for inclusion in such a product must address particularly challenging organoleptic issues.

SUMMARY

Described herein are a packaged food product and methods of making and using it. In some embodiments, the packaged food product comprises a cup containing multiple ingredients in sealed pouches suitable for use in making an egg-based food item or entrée with similarities to an omelet, breakfast scramble, or other egg-based entrées, with the cup being suitable for microwave cooking of an egg-based food item. In some embodiments, the ingredients include vegetable components that offer organoleptic properties similar to those of fresh vegetables after an extended period of time. Preferably, time required for processing, shipment, storage, etc., which may be, e.g., several weeks, may pass without unacceptable degradation of taste, texture, mouth feel, flavor, aroma, color, nutritional content or other important qualities. In some embodiments, the ingredients may also include additional components, such as, for example, one or more meats, e.g., ham, sausage, bacon, Canadian bacon or the like; one or more cheeses; and/or mushrooms. The packaged food product may be provided with or without a liquid egg component.

In some embodiments, the packaged food product may include instructions for the consumer to perform some or all of the following steps, either in the order set forth below or in a different order:
1. Remove or otherwise open a lid of the cup
2. Remove the pouches from the cup
3. Add an egg to the cup, e.g., by cracking a fresh egg (not provided with the packaged food product) and adding the liquid egg component to the cup
4. Mix or stir the egg in the cup (either before or after step 5)
5. Open the pouches and add some or all of the pouch contents to the cup
6. Heat or cook the contents of the cup, e.g., by placing the cup in a microwave oven
7. Add a component such as shredded cheese, from one of the pouches or from another source, during and/or after microwave heating In some embodiments, vegetable components are prepared by the following process:
blanching the vegetable pieces for a predetermined period of time at a temperature effective to inhibit enzyme action detrimental to organoleptic properties, and to have an antimicrobial effect;
acidifying the vegetable pieces in acid media for a period of time sufficient to have a further antimicrobial effect without unacceptably affecting organoleptic properties;
freezing the vegetable pieces to a temperature of below 5° F. using an IQF technique;
sealing the frozen vegetable pieces in containers;
storing the vegetable pieces;
thawing the vegetable pieces; and
subjecting the vegetables to an HPP process;
wherein the process enables freshness of the vegetable pieces to be maintained in the sealed containers at refrigerated temperatures for 75 to 90 days.

In some embodiments, the vegetable pieces are acidified during or after blanching. In some embodiments, acidifying the vegetable pieces comprises immersing the vegetable pieces in acid media. In some embodiments, the vegetable pieces comprise diced vegetable pieces, each having a minimum dimension greater than about ⅛ inch, and a maximum dimension of less than ⅞ inch. In some embodiments, the vegetable pieces comprise diced potato pieces having dimensions of about ¼ inch×⅜ inch×⅜ inch, and other vegetable pieces having dimensions of about ⅜ inch× ⅜ inch×⅜ inch. In some embodiments the vegetables increase in weight by about 1% to about 12% as a result of absorption of acid media during acidification. In some examples, the vegetable pieces may increase in weight by about 5% to 6%, or by about 5.6%.

In some embodiments, acidifying the vegetable pieces comprises exposing the vegetable pieces to a citric acid media. In some embodiments, the acid media may have pH of between 2.0 and 3.0, or more specifically may have a pH of about 2.1 to 2.2. In some embodiments, the acid media may comprise about 2% citric acid and about 3% sugar in distilled water for a time period of between 1 and 20 minutes.

In some embodiments, acidifying the vegetable pieces comprises exposing potato pieces to acid media having a pH of between 2.0 and 3.0 comprising about 2% citric acid and about 3% sugar in distilled water media for a time period of about 8 minutes, and exposing other vegetable pieces to acid media having a pH of between 2.0 and 3.0 comprising about 2% citric acid and about 3% sugar in distilled water for a time period of about 4.5 minutes. Acidifying the vegetable pieces may comprise reducing the pH of the vegetable pieces to less than 5, and in some of these embodiments, less than 4. In some embodiments, acidification reduces the pH of the vegetable pieces to about 3.6 to 3.8, or more specifically to about 3.68.

In some embodiments, freezing the vegetable pieces comprises reducing the temperature of the vegetable pieces to about 0° F.

In some embodiments, where the vegetable pieces include potato pieces, care may be taken to avoid exposure of the potato pieces to ambient air for more than 5 to 10 minutes prior to blanching, to avoid browning of the potato pieces.

In some embodiments, the process may comprise the following sequence of steps:

providing raw, washed, diced potato pieces having dimensions of about ¼ inch×⅜ inch×⅜ inch, and other raw, washed, diced vegetable pieces having dimensions of about ⅜ inch×⅜ inch×⅜ inch, comprising:

steam blanching the raw, washed diced potato pieces by exposing them to steam at a temperature of 200 to 212° F. for 4 to 6 minutes, the steam blanching of the raw potato pieces being effective to inhibit enzyme action detrimental to organoleptic properties, and the steam blanching also having an antimicrobial effect;

steam blanching other raw, washed diced vegetable pieces by exposing them to steam at a temperature of about 210° F. for a period of 40 to 50 seconds, with the steam blanching of the other vegetable pieces being effective to inhibit enzyme action detrimental to organoleptic properties, and also having an antimicrobial effect;

thereafter acidifying the blanched potato pieces with citric acid media to reduce the pH of the blanched potato pieces to less than about 5; and acidifying the other blanched vegetable pieces with citric acid media to reduce the pH of the other vegetable pieces to less than about 5;

reducing the temperature of the blanched, acidified vegetable pieces to about 0° F. using an IQF process to preserve them for later use;

thereafter hermetically sealing the blanched, acidified, frozen vegetable pieces in flexible pouches under vacuum with a nitrogen atmosphere;

thereafter thawing the blanched, acidified vegetable pieces in the pouches; and thereafter pressurizing the thawed vegetable pieces to about 86,500 psi for about 3 minutes at a temperature of about 41° F. in an HPP process.

Also described herein is a packaged food product comprising packaged vegetables pieces, wherein the product has a refrigerated shelf life of at least 75 days, and wherein the vegetable pieces have been prepared by:

steam blanching raw, washed potato pieces by exposing the raw potato pieces to steam, the steam blanching of the raw potato pieces being effective to inhibit enzyme action detrimental to organoleptic properties, and the steam blanching having an antimicrobial effect;

steam blanching other raw, washed vegetable pieces by exposing them to steam, the steam blanching of the other vegetable pieces being effective to inhibit enzyme action detrimental to organoleptic properties, the steam blanching also having an antimicrobial effect;

thereafter acidifying the blanched potato pieces with citric acid media to reduce the pH of the blanched potato pieces to less than about 5; and acidifying the other blanched vegetable pieces with citric acid media to reduce the pH of the other vegetable pieces to less than about 5;

reducing the temperature of the blanched, acidified vegetable pieces to about 0° F. using an IQF process to preserve them for later use;

thereafter hermetically sealing the blanched, acidified, frozen vegetable pieces in flexible pouches under vacuum with a nitrogen atmosphere;

thereafter thawing the blanched, acidified vegetable pieces in the pouches; and thereafter pressurizing the thawed vegetable pieces to about 86,500 psi for about 3 minutes at a temperature of about 41° F. in an HPP process.

The other vegetable pieces may comprise, for example, one or more of green bell peppers, onions, and red bell peppers. The packaged food product may further comprise a cup containing the packaged vegetable pieces, and additional, separately packaged food items. The additional, separately packaged food items may include, e.g., one or more of meat, cheese and mushrooms. The meat may comprise one or more of ham, bacon, Canadian bacon, sausage, and/or other meats. The cheese may comprise one or more of extra sharp cheddar, sharp cheddar, mild cheddar, American cheese, Swiss cheese, and/or other varieties of cheese.

The above-mentioned cup may be of sufficient size to accommodate the liquid components of an egg in addition to the vegetable pieces and the other separately packaged food items mentioned above, with sufficient extra room to accommodate expansion of the egg and other food items during microwave cooking, and wherein the packaged food product further comprises a removable lid or membrane on the cup, a shrink label on the cup, and instructions for making an egg-based entrée by adding the liquid components of an egg to the cup, combining the vegetable components and additional, separately packaged food items with the egg in the cup, and heating the combination in a microwave oven. The lid may have microperforations therein to accommodate pressure changes.

In some embodiments, the packaged food product can include a microwavable rigid cup having a rim defining a generally circular opening to an interior of the cup, a base, and a sidewall extending between the rim and the base. A first flexible pouch can be disposed within the interior of the cup. The first flexible pouch can contain cheese pieces. A second flexible pouch can also be disposed within the interior of the cup. The second flexible pouch can contain one or more vegetables, for example, acidified vegetables having a pH of between 3.5 and 5.0. A flexible membrane sealed to the rim of the cup, with the first and second pouches disposed within the cup, to block the opening prior to at least partial removal of the membrane.

In some embodiments, of the packaged food product, a diameter of the base of the cup is less than the diameter of the opening. For example, the diameter of the base of the cup can be between about 55% and 75% less than the diameter of the opening.

In some embodiments, the diameter of the opening can be between about 120% and 140% of a height of the cup. This range can facilitate microwave heating, as will be discussed further below.

In some embodiments, the packaged food product can further include a third flexible pouch containing a plurality of pieces of one or more meat products.

In some embodiments, two or more of the pouches are optionally joined together.

In some embodiments, the method of making a microwaved food product using the packaged food product described herein can include at least partially removing the membrane to provide access to the interior of the cup; removing the first and second pouches from the interior of the cup via the opening; adding egg (which can optionally be supplied by the consumer) to the interior of the cup via the opening; opening the first and second pouches (and, if present, the third pouch); adding contents of the pouches to the interior of the cup via the opening; and microwaving the cup containing the egg and the contents of the pouches. The egg can either be added before or after the addition of the contents of the pouches, or after the addition of only some or one of the pouches and before the addition of others or another of the pouches.

In some embodiments, the step of microwaving the cup containing the egg and the contents of the pouches further comprises the steps of microwaving for a first time period, followed by stirring the egg and the contents of the pouches, followed by microwaving for a second time period. The first time period can be between 30 and 50 seconds, and can be about 40 seconds. The second time period can be between 30 and 50 seconds, and can be between about 40 and 45 seconds. The second time period can be less than the first time period. The first time period and the second time period can be cumulatively less than 90 seconds.

In some embodiments, a method of assembling the packaged food product described herein can include depositing the first pouch through the opening and into the interior of the cup; depositing the second pouch through the opening and into the interior of the cup; and closing the opening of the cup using the membrane. The method of assembling can optionally include elevating one of the pouches using another or others of the pouches. Preferably, though not necessarily, the pouch containing the vegetables is disposed closest to the opening of the cup.

BRIEF DESCRIPTION OF THE DRAWINGS

FIGS. 11-16 illustrate effects of acidification on pH and weight of 100 g batches of vegetable pieces immersed in 100 g quantities of citric acid media and ascorbic acid media;

FIGS. 17-23 illustrate effects of acidification on pH and weight of 1015 g batches of vegetable pieces immersed in 1600 g quantities of citric acid media and ascorbic acid media;

FIGS. 24-28 illustrate effects of acidification on pH and weight of batches of vegetable pieces immersed in 1000 g quantities of citric acid media of varying concentrations.

DETAILED DESCRIPTION

Figure 1:
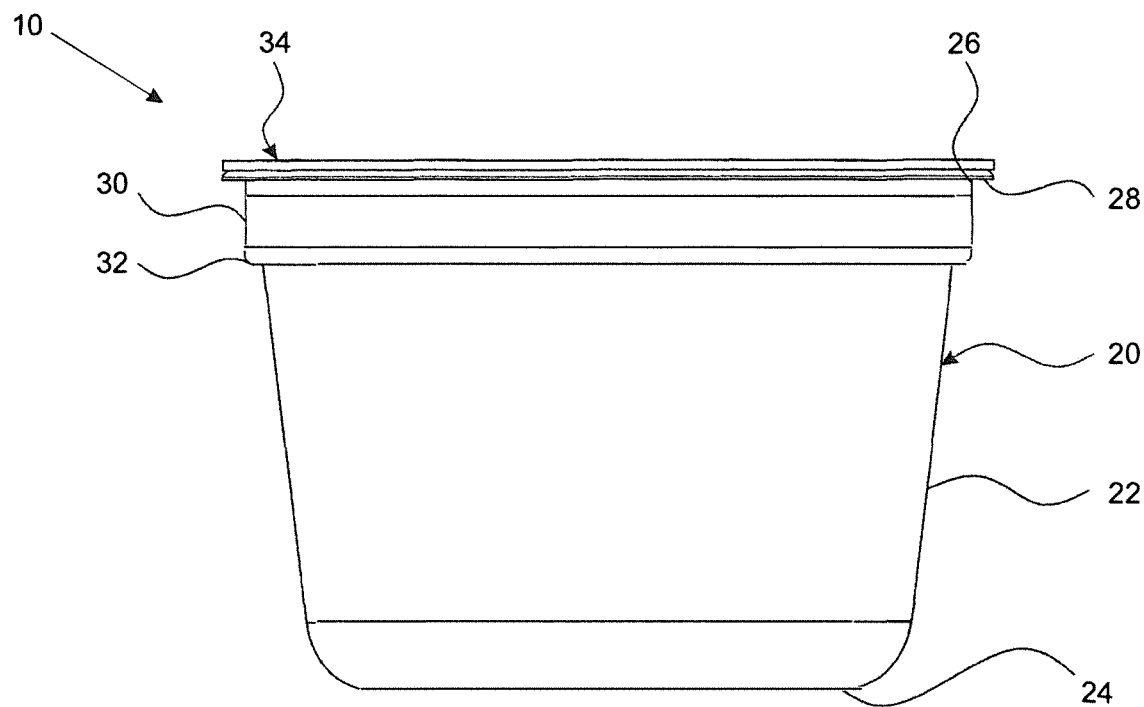
FIG. 1 is a side elevation view of a packaged food product showing a cup and a membrane closing an opening of the cup.
Figure 2:
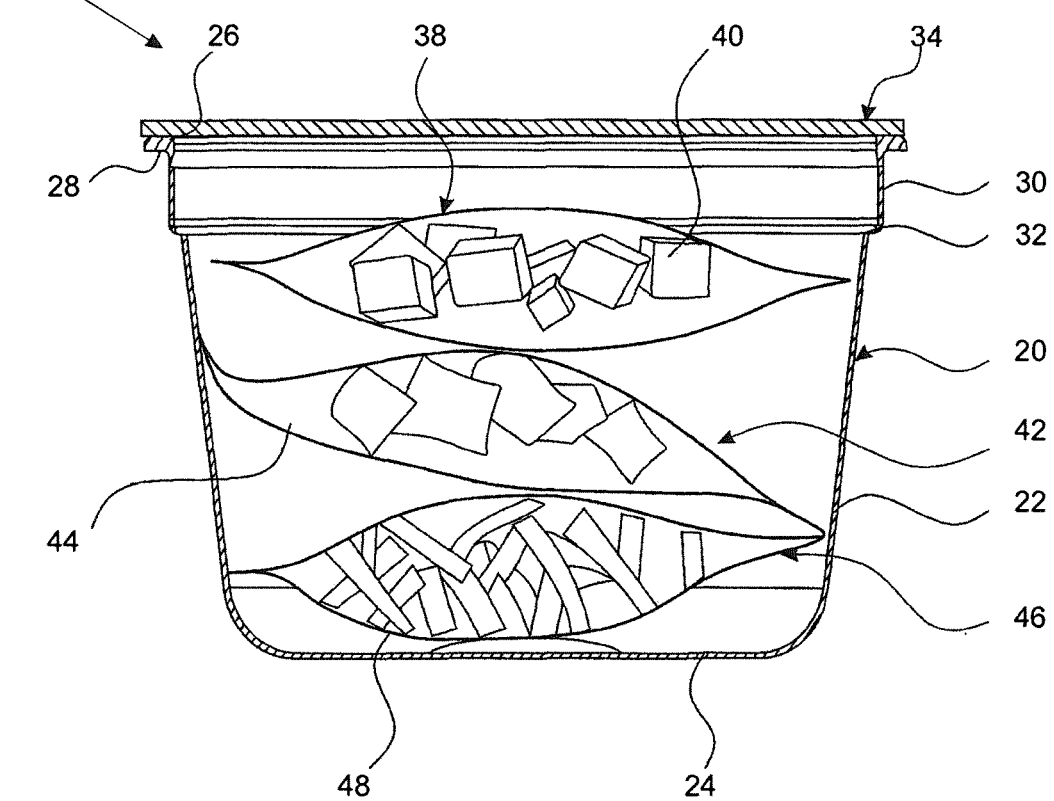
FIG. 2 is a cross-section of the packaged food product of FIG. 1 taking along a centerline thereof, showing three pouches disposed in an interior of the cup, with each of the pouches containing a different food product (shown schematically for illustrative purposes)
Figure 3:
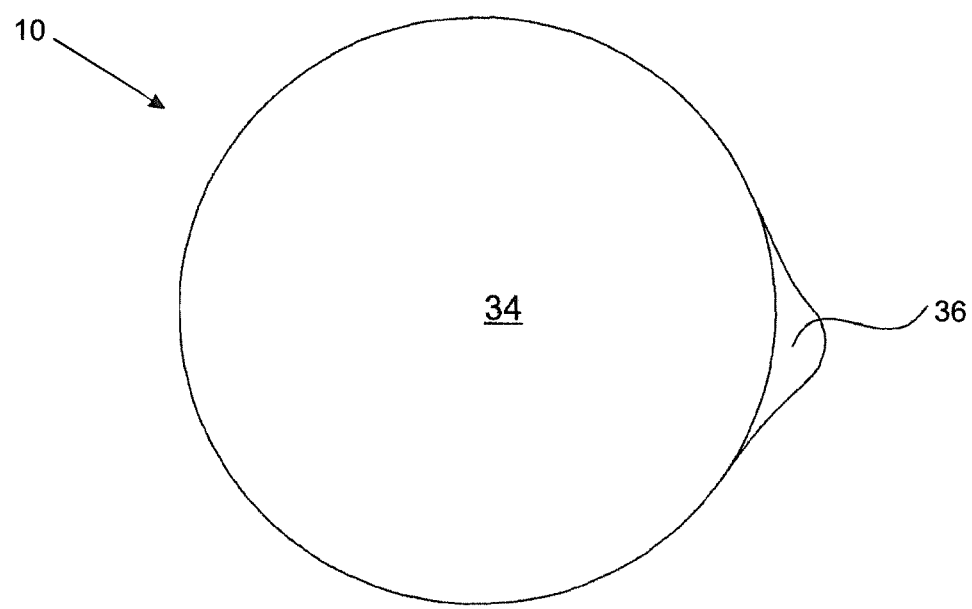
FIG. 3 is a top plan view of the packaged food product of FIG. 1, rotated 90 degrees clockwise and showing the membrane along with a tab portion thereof.
Figure 4:
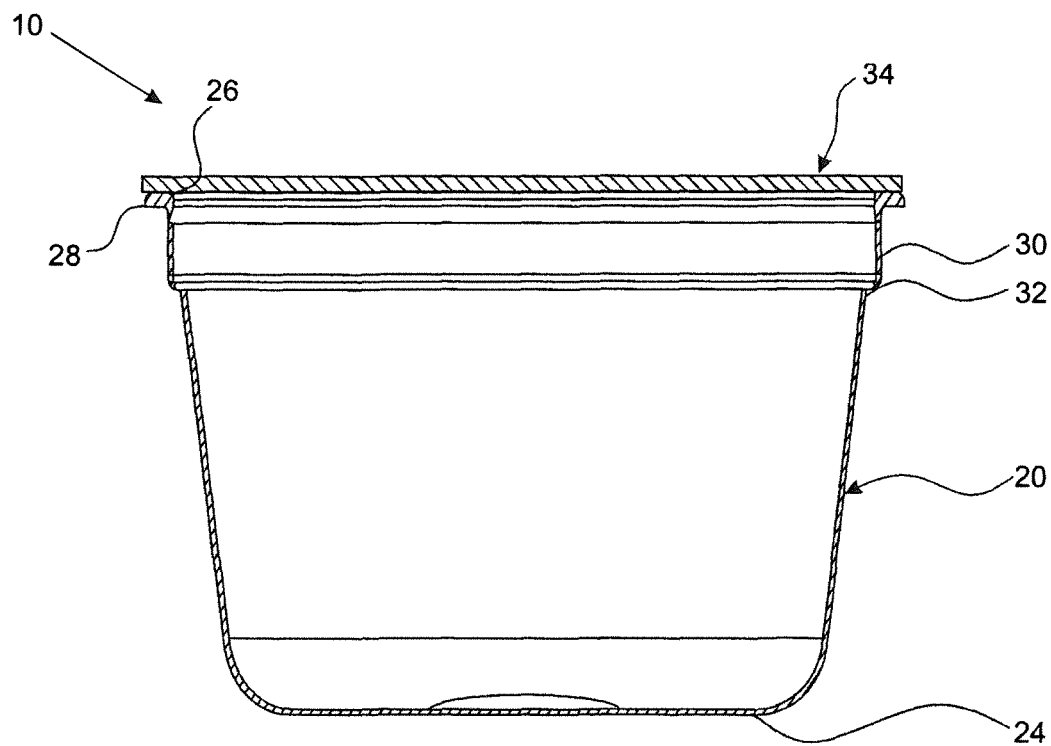
FIG. 4 is a cross-section view of only the cup and membrane of the packaged food product of FIG. 1, with the three pouches omitted for illustrative purposes.

Described herein are a packaged food product and methods of making and using it. In some embodiments, the packaged food product comprises a cup containing multiple ingredients in sealed pouches suitable for use in making an omelet or other egg-based entrées, with the cup being suitable for microwave cooking of an egg-based entrée. The pouches may be transparent, and may be flexible, thermoformed pouches. In some embodiments, the ingredients include vegetable pieces such as diced vegetables that offer organoleptic properties similar to those of fresh vegetable pieces after an extended period of time. In some embodiments, after being prepared and processed as described herein, the vegetables may be maintained in refrigerated conditions, e.g., at temperatures of about 40° F. or 45° F., for a period of time required for processing, shipment, storage, etc., which may be, e.g., 75 to 90 days, without unacceptable degradation of taste, texture, mouth feel, flavor, aroma, color, nutritional content or other important qualities. In some embodiments, in addition to the vegetable pieces mentioned above, the ingredients may also include components such as, for example, one or more meats, e.g., ham, sausage, bacon, Canadian bacon or the like; one or more cheeses; and/or mushrooms. The packaged food product may be provided with or without a liquid egg component.

A packaged food product 10 is described herein and illustrated in FIGS. 1-6. The packaged food product 10 includes a microwavable rigid cup 20, a plurality of pouches 38, 42, 46 each containing one or more food products 40, 44, 48 disposed within the cup 20, and a membrane 34 closing the cup 20 with the pouches 38, 42, 46 therein. The packaged food product 10 is configured to be used with addition of one or more eggs to prepare a food item using microwave heating. Broadly, the packaged food product 10 can be opened, the pouches 38, 42, 46 removed from the cup 20, contents of the pouches 40, 44, 48 and one or more eggs added to the cup 20 to form a mixture, and then the mixture heated to prepare the food item. Optionally, the food item can be consumed directly from the cup 20.

Figure 8:
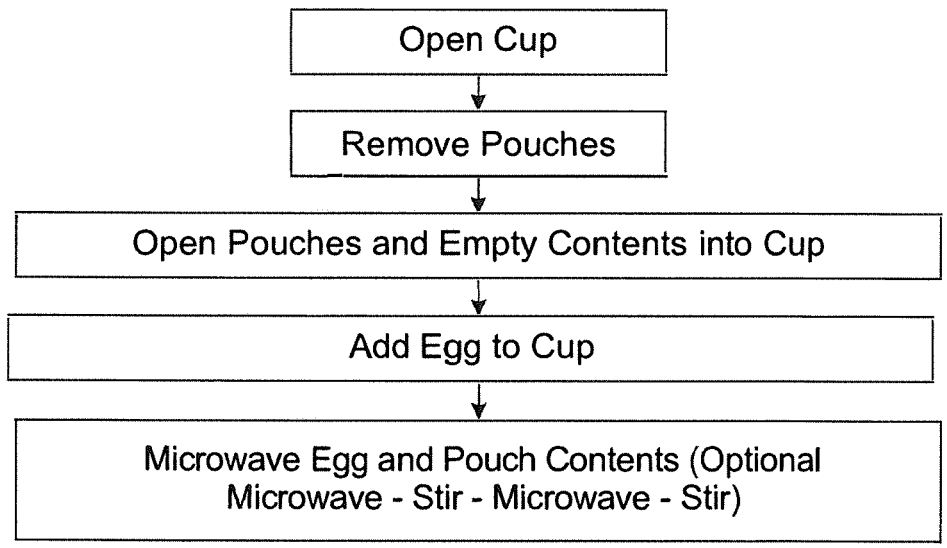
FIG. 8 is a diagram of preparation steps for the packaged food product of FIG. 1.

In some embodiments, the packaged food product may include instructions for the consumer to perform some or all of the following steps and/or the steps identified in FIG. 8, either in the order set forth below or in a different order:

1. Remove or otherwise open a lid to access the interior of the cup
2. Remove the pouches from the cup
3. Add an egg to the cup, e.g., by cracking a fresh egg (not included), or by using an included packet of liquid egg product, and adding the liquid egg component to the cup
4. Mix or stir the egg in the cup, before, during or after step 5
5. Open the pouches and add some or all of the pouch contents to the cup
6. Heat or cook the contents of the cup, e.g., by placing the cup in a microwave oven
7. Add a component such as shredded cheese, from one of the pouches or from another source, during or after microwave heating.

Figure 9:
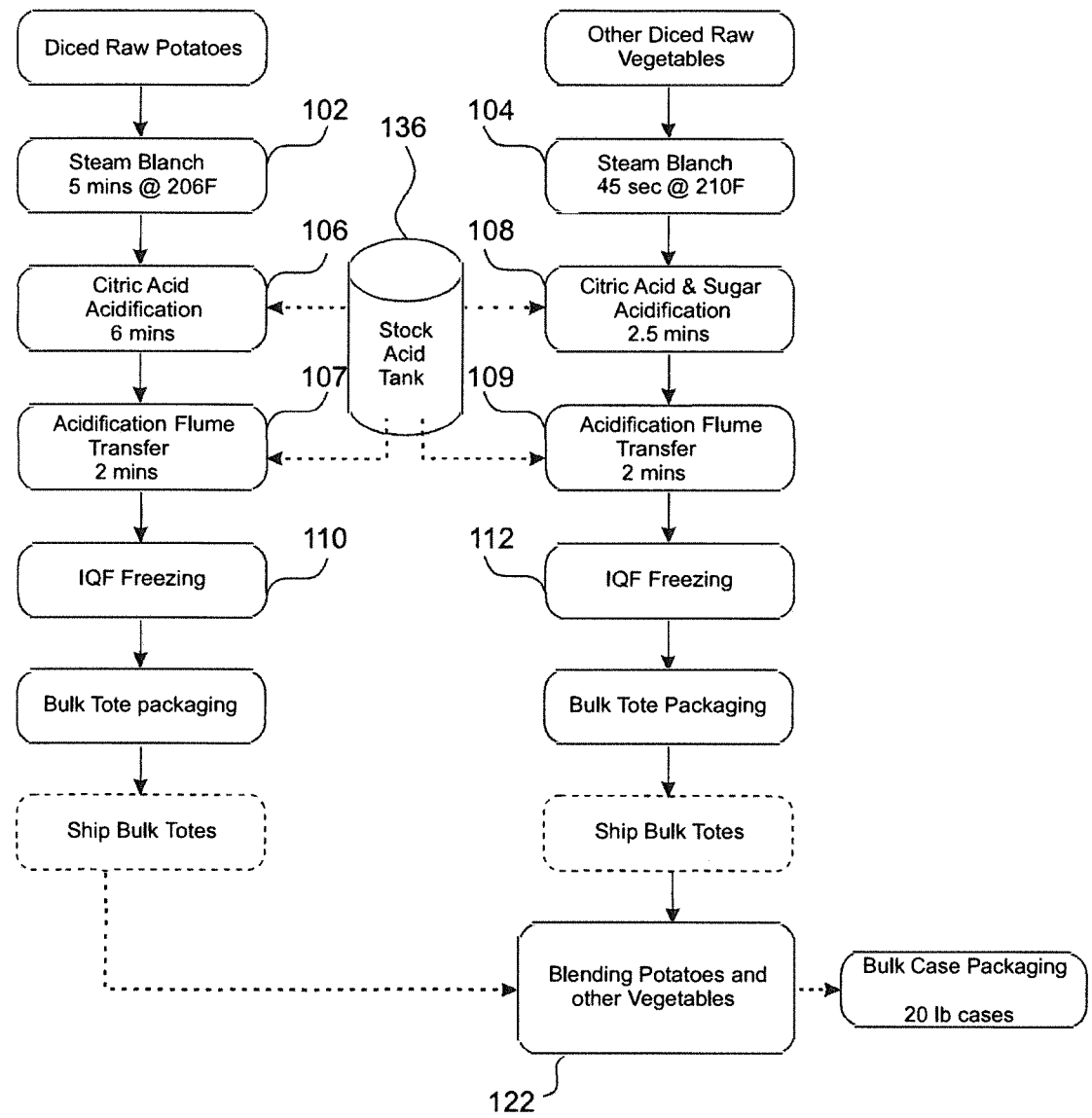
FIGS. 9 and 10 are flow charts illustrating steps of a process described herein.
Figure 10:
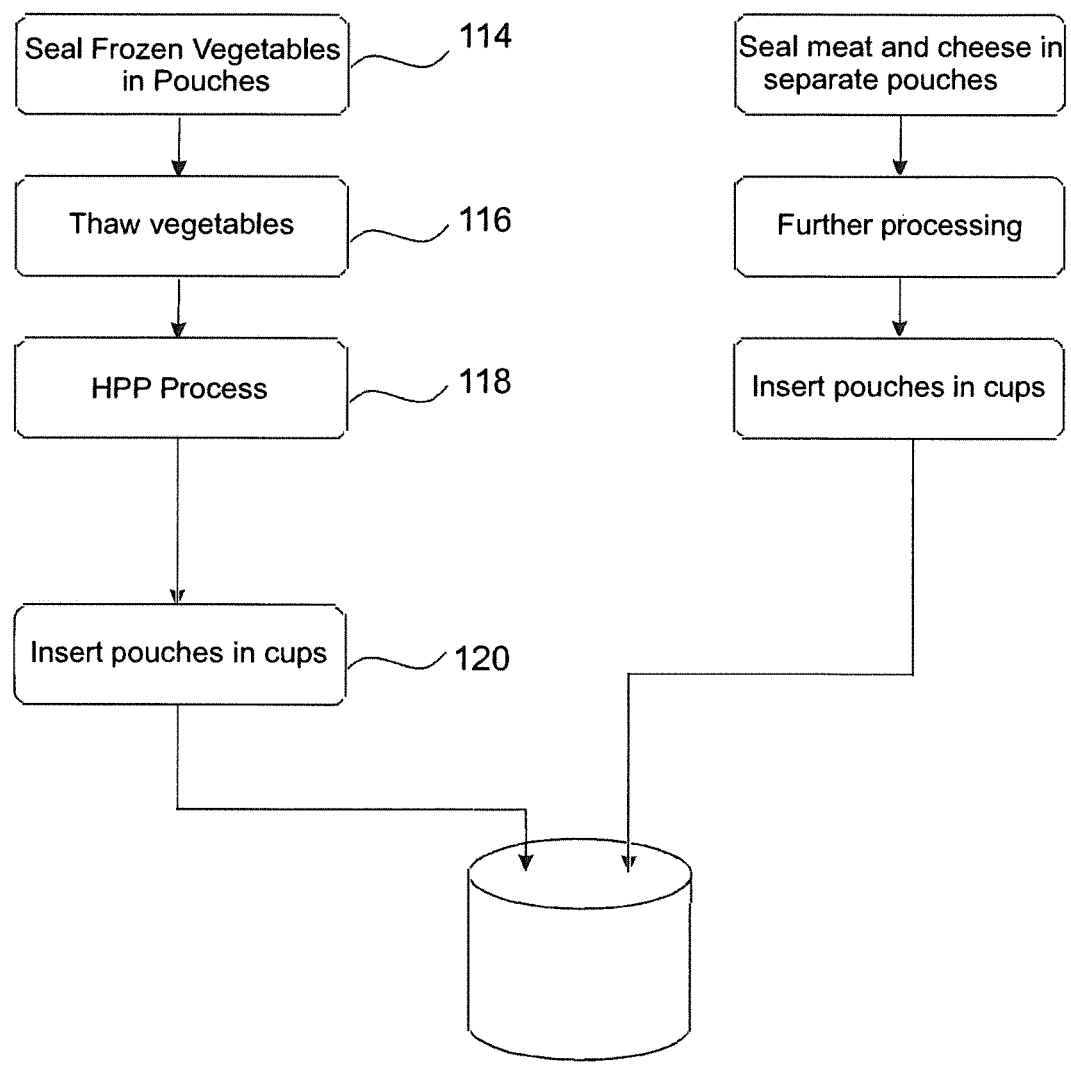

In some embodiments, vegetable components are prepared by the following process, as illustrated in FIGS. 9 and 10:

blanching 102, 104 the vegetable pieces for a predetermined period of time at a temperature effective to inhibit enzyme action detrimental to organoleptic properties, and to have an antimicrobial effect; acidifying 106, 107, 108, 109 the vegetable pieces in acid media for a period of time sufficient to have a further antimicrobial effect without unacceptably affecting organoleptic properties; freezing 110, 112 the vegetable pieces to a temperature of below 5° F. using an IQF technique; sealing 114 the frozen vegetable pieces in containers; storing the vegetable pieces; thawing 116 the vegetable pieces; and subjecting the vegetables to an HPP process 118.

In some embodiments, the process enables freshness of the vegetable pieces to be maintained in the sealed containers at refrigerated temperatures for 75 to 90 days.

Figure 29:
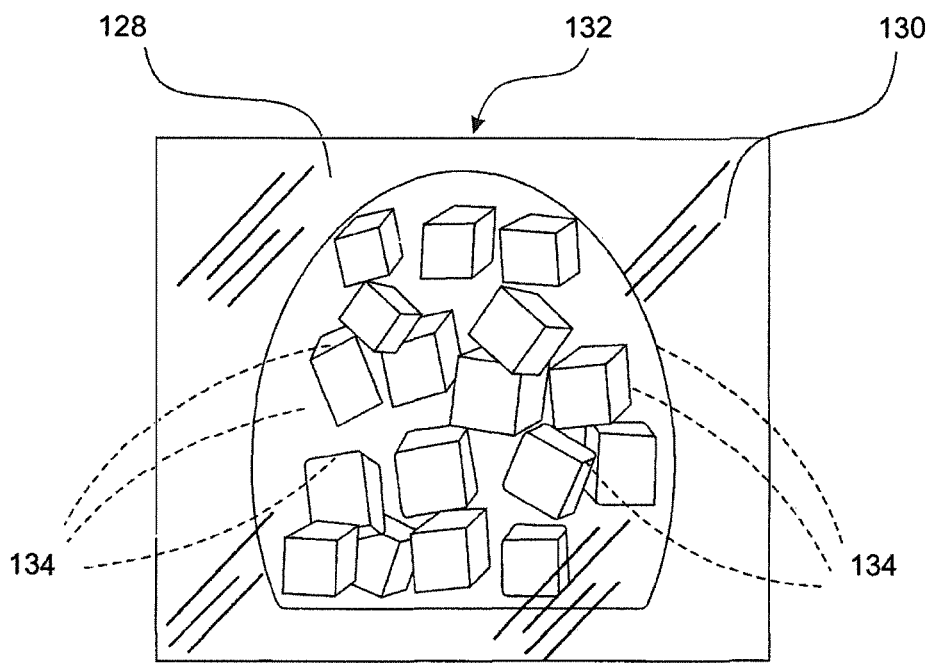
FIGS. 29-31 illustrate an embodiment of a vegetable pouch as described herein.
Figure 30:
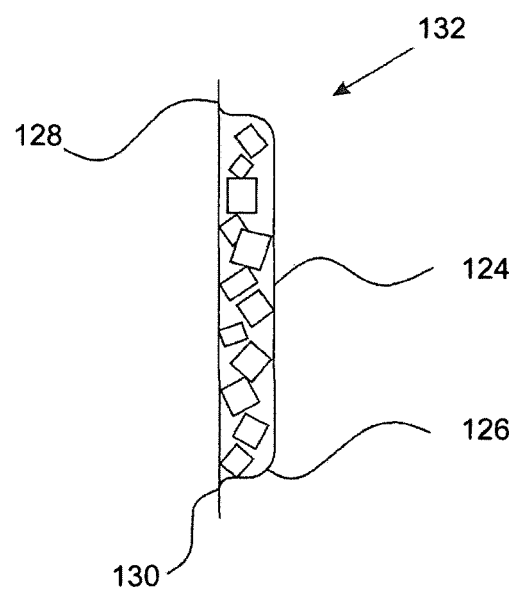
Figure 31:
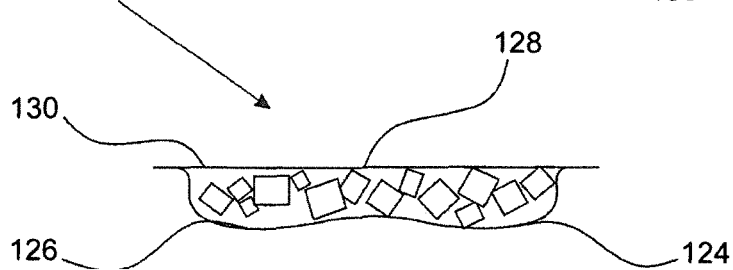

FIGS. 29-31 illustrate a hermetically sealed pouch containing vegetable pieces 134 after they have been processed as described above. The illustrated pouch 132 comprises a thermoformed back wall 124 having a cavity 126 for the vegetable pieces, a front wall 128 that may be generally flat, and a peripheral seal area 130 at which the front and back walls are sealed to one another.

The process for preparation of the vegetable components is preferably a commercial process suitable for mass production of nutritious, high quality food products. In some embodiments, the vegetable pieces are acidified during or shortly after blanching. In some embodiments, the blanching and acidification may be carried out at rates of more than 5,000 lbs. per hour, or more specifically, more than 10,000 lbs. per hour. In some embodiments, the rate of blanching and acidifying potatoes may be about 15,000 lbs. per hour and the rate of blanching other vegetables such as peppers and onions may be about 12,000 lbs. per hour.

In some embodiments, the vegetable pieces comprise diced vegetable pieces that are approximately cubic in shape, with sides of greater than about 1/8 inch and less than 7/8 inch in length. In some embodiments, the vegetable pieces comprise diced potato pieces having dimensions of about 1/4 inch×3/8 inch×3/8 inch, and other vegetable pieces having dimensions of about 3/8 inch×3/8 inch×3/8 inch. In some embodiments the vegetables increase in weight by about 1% to about 12% as a result of absorption of acid media during acidification. In some examples, the vegetable pieces may increase in weight by 5% to 6%, or by about 5.6%.

In some embodiments, acidifying the vegetable pieces comprises exposing the vegetable pieces to a citric acid media. In some embodiments, the acid media may have pH of between 2.0 and 3.0, or more specifically may have a pH of about 2.1 to 2.2. In some embodiments, the acid media may comprise about 2% citric acid and about 3% sugar in distilled water for a time period of between 1 and 20 minutes.

In some embodiments, acidifying the vegetable pieces comprises exposing potato pieces to acid media having a pH of between 2.0 and 3.0 comprising about 2% citric acid and about 3% sugar in distilled water media for a time period of about 8 minutes, and exposing other vegetable pieces to acid media having a pH of between 2.0 and 3.0 comprising about 2% citric acid and about 3% sugar in distilled water for a time period of about 4.5 minutes. Acidifying the vegetable pieces may comprise reducing the pH of the vegetable pieces to less than 5, and in some of these embodiments, less than 4. In some embodiments, acidification reduces the pH of the vegetable pieces to about 3.6 to 3.8, or more specifically to about 3.68.

In some embodiments, freezing the vegetable pieces comprises reducing the temperature of the vegetable pieces to about 0° F.

In some embodiments, where the vegetable pieces include potato pieces, care may be taken to avoid exposure of the potato pieces to ambient air for more than 10 minutes prior to blanching, to avoid browning of the potato pieces.

In some embodiments, the process may comprise the following sequence of steps:

providing raw, washed, diced potato pieces having dimensions of about 1/4 inch×3/8 inch×3/8 inch, and other raw, washed, diced vegetable pieces having dimensions of about 3/8 inch×3/8 inch×3/8 inch, comprising:

steam blanching the raw, washed diced potato pieces by exposing them to steam at a temperature of 200 to 212° F. for 4 to 6 minutes, the steam blanching of the raw potato pieces being effective to inhibit enzyme action detrimental to organoleptic properties, and the steam blanching also having an antimicrobial effect;

steam blanching other raw, washed diced vegetable pieces by exposing them to steam at a temperature of about 210° F. for a period of 40 to 50 seconds, with the steam blanching of the other vegetable pieces being effective to inhibit enzyme action detrimental to organoleptic properties, and also having an antimicrobial effect;

thereafter acidifying the blanched potato pieces with citric acid media to reduce the pH of the blanched potato pieces to less than about 5; and acidifying the other blanched vegetable pieces with citric acid media to reduce the pH of the other vegetable pieces to less than about 5;

reducing the temperature of the blanched, acidified vegetable pieces to about 0° F. using an IQF process to preserve them for later use;

thereafter hermetically sealing the blanched, acidified, frozen vegetable pieces in flexible pouches under vacuum with a nitrogen atmosphere;

thereafter thawing the blanched, acidified vegetable pieces in the pouches; and thereafter pressurizing the thawed vegetable pieces to about 86,500 psi for about 3 minutes at a temperature of about 41° F. in an HPP process.

Also described herein is a packaged food product comprising packaged vegetables pieces, wherein the product has a refrigerated shelf life of at least 75 days, and wherein the vegetable pieces have been prepared by:

steam blanching raw, washed potato pieces by exposing the raw potato pieces to steam, the steam blanching of the raw potato pieces being effective to inhibit enzyme action detrimental to organoleptic properties, and the steam blanching having an antimicrobial effect;

steam blanching other raw, washed vegetable pieces by exposing them to steam, the steam blanching of the other vegetable pieces being effective to inhibit enzyme action detrimental to organoleptic properties, the steam blanching also having an antimicrobial effect;

thereafter acidifying the blanched potato pieces with citric acid media to reduce the pH of the blanched potato pieces to less than about 5; and acidifying the other blanched vegetable pieces with citric acid media to reduce the pH of the other vegetable pieces to less than about 5;

reducing the temperature of the blanched, acidified vegetable pieces to about 0° F. using an IQF process to preserve them for later use;

thereafter hermetically sealing the blanched, acidified, frozen vegetable pieces in flexible pouches under vacuum with a nitrogen atmosphere;

thereafter thawing the blanched, acidified vegetable pieces in the pouches; and thereafter pressurizing the thawed vegetable pieces to about 86,500 psi for about 3 minutes at a temperature of about 41° F. in an HPP process.

The other vegetable pieces may comprise, for example, one or more of green bell peppers, red bell peppers, onions, mushrooms, tomatoes, cilantro, garlic, and green onions. The packaged food product may further comprise a cup containing the packaged vegetable pieces, and additional, separately packaged food items. The additional, separately packaged food items may include, e.g., one or more of meat and/or cheese. The meat may comprise one or more of ham (such as Applewood smoked ham or other flavored ham), bacon, Canadian bacon, sausage (such as pork, turkey or chorizo sausage), and/or other meats. Depending upon the type of meat, the meat may be shredded, crumbled, diced or otherwise reduced to suitable size pieces. The cheese may comprise one or more of extra sharp cheddar, sharp cheddar, mild cheddar, American cheese, Swiss cheese, mozzarella, pepper jack, and/or other varieties of cheese.

The food products, along with various seasonings, can be provided in the following non-limiting, exemplary combinations, numbered 1-5:

| Cheese | Meat | Vegetable(s) |
|---|---|---|
| Sharp Cheddar | Bacon Bits | Diced Potato |
| Mild Cheddar | Diced Ham | Green Bell Pepper & Onion, Diced Potato |
| Mozzarella | Turkey Sausage | Red Bell Pepper, Mushroom & Onion, Diced Potato |
| Mild Cheddar | Pork Sausage | Red/Green Bell Pepper & Onion, Diced Potato |
| Pepper Jack | Chorizo Sausage | Red/Green Bell Pepper & Onion, Tomatoes, Jalapenos, Green Onions, Cilantro, Garlic, Diced Potato |

The above-mentioned cup may be of sufficient size to accommodate the liquid components of an egg in addition to the vegetable pieces and the other separately packaged food items mentioned above, with sufficient extra room to accommodate expansion of the egg and other food items during microwave cooking without overflowing, and wherein the packaged food product further comprises a removable lid on the cup, a shrink label on the cup, and instructions for making an egg-based entrée by adding the liquid components of an egg to the cup, combining the vegetable components and additional, separately packaged food items with the egg in the cup, and heating the combination in a microwave oven. The lid may have microperforations therein to accommodate pressure changes.

Blanching

In some embodiments, the blanching process described above is a steam blanch in which the vegetable pieces are exposed to steam while on a continuous conveyor. In other embodiments, the blanching process may comprise immersion of the vegetable pieces in boiling water, a chemical blanch, or another blanch process.

In some embodiments, the blanch process for potato pieces may comprise steam blanching the raw, washed, diced potato pieces by exposing them to steam at a temperature of 200 to 212° F. for 4 to 6 minutes, or about 5 minutes. This steam blanching of the raw potato pieces is believed to be effective to inhibit enzyme action detrimental to organoleptic properties, and this steam blanching is also believed to have an antimicrobial effect sufficient that, in combination with other steps described herein, no further heating of the potato pieces is required for antimicrobial purposes.

In some embodiments, the blanch process for vegetable pieces other than potato pieces, including, e.g., bell pepper and onion pieces, comprises steam blanching the raw, washed, diced vegetable pieces by exposing them to steam at a temperature of about 210° F. for a period of 40 to 50 seconds, or about 45 seconds, with the steam blanching being effective to inhibit enzyme action detrimental to organoleptic properties, and also having an antimicrobial effect. This steam blanching of the subject vegetable pieces is also believed to have an antimicrobial effect sufficient that, in combination with other steps described herein, no further heating of the vegetable pieces is required for antimicrobial purposes. This helps to provide the vegetable pieces with organoleptic qualities similar to those of fresh vegetables over extended periods of refrigerated storage.

Where the blanch involves heating of the vegetable pieces, they may be cooled by forced convection or another cooling process after being heated. Forced convection may include, e.g., passing the vegetable pieces through ambient airflow or other forms of forced convection for periods of, e.g., 5 seconds to about 5 minutes, 5 seconds to 30 seconds, or about 15 seconds.

Acidification

In some embodiments, acidification occurs after blanching. It is believed that blanching may facilitate subsequent acidification by opening the cell structure of vegetable pieces and/or otherwise increasing the rate at which acid media may be absorbed by the vegetable pieces. In some embodiments, acidification may take place immediately after blanching, e.g., within 5 to 10 minutes of blanching, as part of an integrated, in-line process.

The acidification process may comprise exposing the vegetable pieces to an acid media. In some embodiments, the vegetable pieces may be sprayed, washed, immersed in, and/or otherwise exposed to a liquid acid media in continuous or batch processes. In some embodiments, the process may involve spraying or washing the vegetable pieces with acid media in addition to immersing them in the acid media. The acidification process may involve exposure of all or substantially all of the vegetable pieces' surfaces to the acid media for sufficient time to enable the acid media to permeate or substantially permeate each vegetable piece. In some embodiments, the acidification process may be carried out at or near ambient temperatures of, e.g., 70 to 80° F. In other embodiments, the acidification process may take place at elevated temperatures or below-ambient temperatures. In particular, the vegetable pieces may begin the acidification process at elevated temperatures as a result of the acidification process following closely after blanching, with the acid media beginning the process at ambient temperatures of 70 to 80° F. Alternatively, the vegetable pieces may be cooled to below ambient temperatures after blanching and prior to acidification, and/or the acid media may be cooled to below ambient temperatures for the acidification process.

In one example, the acidification process comprises immersion of vegetable pieces in acid media comprising 1% to 20% citric acid, ascorbic acid, or pHase™ food grade sodium acid sulfate in water, a product marketed by Jones-Hamilton Co. More specifically, the acid media may comprise, for example, 0.1% to 5%, 0.5% to 2.5%, 0.5% to 1.5%, about 1%, about 2%, or about 3% or about 2% citric acid, ascorbic acid, or pHase food grade sodium acid sulfate in water. In some embodiments, the acid media may include sugar in amounts of, e.g., 0.1% to 20%, 1% to 10%, 2% to 5%, 2.5% to 3.5%, or 3%. The water may be distilled water. All percentages herein refer to weight percentages.

In some embodiments, the pH of the acid media may be, for example, between 1 and 6.5. In some examples, the acid media may comprise an ascorbic acid media with a pH of between 2.5 and 3. In some examples, the acid media may comprise a citric acid media with a pH of between 2 and 2.5, or a pHase acid media having a pH of between 1.1 and 1.6. In some examples, the acid media may comprise combinations of the acids and other components mentioned above, and/or may comprise other acids and other ingredients not mentioned above, e.g., vinegar, acetic acid, malic acid, tartaric acid, lactic acid, benzoic acid, or sorbic acid.

Citric acid is believed to have certain advantages. As shown, e.g., in FIGS. 11-15, on a per pound basis, citric acid is believed to be more effective in reducing pH than ascorbic acid. Also, the taste of vegetables acidified with citric acid media is believed to be preferable to consumers as compared with the taste of vegetables treated with certain other media. In particular, it is believed that use of some acid media may result in vegetables having an undesirable aftertaste. An additional advantage of citric acid is that it may help to whiten potato pieces, or at least prevent or inhibit graying of potato pieces over time.

In some embodiments, the pH of the vegetable pieces before acidification may be, e.g., about 5 to about 8, about 5 to about 7, about 5 to about 6, or 5.2 to 5.3. Acidification may adversely affect taste and/or other organoleptic properties. Although this has not been found to be problematic with potato pieces, it has been found that inclusion of a sweetener in acid media may help to avoid other vegetable pieces such as pepper and onion pieces, as well as mushroom pieces, acquiring an overly tangy taste. In some embodiments, concentrations of a sugar such as dextrose in a concentration of e.g., 1% to 5%, 2% to 4%, or about 3% may be suitable for this purpose. Other natural and artificial sweeteners that might be used, alone or in combination with other sweeteners, to provide an effect similar or equivalent to that provided by including 3% dextrose in the acid media, may include for example sucrose, fructose, corn syrup, high fructose corn syrup, acesulfame K, and sucralose.

Also, reduction of acid concentration in the acid media can help to avoid the vegetable pieces acquiring an overly tangy taste, so long as the desired pH can be achieved with a lower acid concentration. In some embodiments, one or more of the acid media formulas provided in FIGS. 11-28 may be used. In some embodiments, the blanched, acidified potato pieces include, in addition to the potato pieces themselves, citric acid and water, but are substantially free of other ingredients. In some embodiments, other vegetable pieces include, in addition to the vegetable pieces, citric acid, sugar and water, but are substantially free of other ingredients, meaning that any other ingredients are in amounts small enough that they need not be listed as ingredients under labeling requirements in the United States. In some embodiments, the pH of the vegetable pieces after acidification may be, e.g., about 2 to about 5.0, 2.5 to 5.0, 2.5 to 4.8, 3.0 to 5.0, 3.5 to 5.0, 4.0 to 5.0, 4.0 to 4.8, 4.4 to 4.6, or about 4.5. Values of the pH of vegetable pieces herein may be determined by pureeing a representative sample of a blend of the pieces.

As noted above, FIGS. 11-16 illustrate effects of acidification on pH and weight of 100 g batches of vegetable pieces immersed in 100 g quantities of citric acid media and ascorbic acid media. FIGS. 17-23 illustrate effects of acidification on pH and weight of 1015 g batches of vegetable pieces immersed in 1600 g quantities of citric acid media and ascorbic acid media. FIGS. 24-28 illustrate effects of acidification on pH and weight of batches of vegetable pieces immersed in 1000 g quantities of citric acid media of varying concentrations.

In some embodiments, acidifying the potato pieces and other vegetable pieces comprises, in each case, immersing the vegetable pieces in acid media in a two-step continuous process wherein the vegetable pieces are subjected to a first acidification step 106, 108 in which they are carried through an acidification vessel by a conveyor, then subjected to a second acidification step 107, 109 in which they are carried through an acidification flume or pipe to a delivery location while immersed in acid media. The dwell time in the vessel may be, e.g., about 5 to 7 minutes for potato pieces, or about 6 minutes as indicated in FIGS. 9; and to 4 minutes, or about 2.5 minutes, as indicated in FIG. 9, for other vegetable pieces. For both potatoes and other vegetables, the acidification flume transfer steps 107 and 109 may take, e.g., 1 to 3 minutes, or about 2 minutes as indicated in FIG. 9. Economies may be realized by using a common source of acid or acid media such as a stock acid tank, shown at 136 in FIG. 9, to supply acid media to the separate parallel acidification operations for the potato pieces and the other vegetable pieces. Where different acid media are to be used for potato pieces and other vegetable pieces that are being acidified simultaneously, separate sources of acid media may be employed, or alternatively a common source of an acid solution may be employed, with one or more additives being supplied separately to customize parallel simultaneous acidification processes. For example, a common source of a 1% citric acid solution may be used for both potato and other vegetable processes, with dextrose being added to the other vegetable process.

The flume or pipe empties the vegetable pieces onto a conventional conveyor shaker, which may remove excess acid media prior to IQF freezing. Excess acid media may be returned to a stock acid tank, acidification flume, or other location for re-use, or otherwise recycled for later use.

Freezing

The IQF freezing process herein enables vegetable pieces, mushroom pieces, and/or other food components to be stored for later use. This provides flexibility with regard to throughput rates and time frames for processes downstream of the IQF process, e.g., bulk tote packaging, shipping of bulk totes, blending 122 of potato pieces and other vegetable pieces, etc.

Cup

The cup 20 is preferably circular and has a bottom or base 24, an upper rim 28 surrounding an opening 26 and including an outwardly extending flange, and a sidewall 22 extending between the rim 28 and the base 24. The diameter of the base 24 is less than the diameter of the opening 26 such that the sidewall 22 is inwardly tapered toward the base 24 during at least part of the span between the opening 26 and the base 24. In one embodiment, illustrated in FIGS. 1-4, the diameter of the base 24 of the cup 20 is between about 55% and 75% less than the diameter of the opening 26, and the diameter of the opening 26 is between about 120% and 140% of the height of the cup 20. If the diameter of the opening 26 is below about 120% of the height of the cup 20, then the middle portion of the mixture in some embodiments can take longer to heat a sufficient amount as compared to if the diameter of the opening 26 is about 120% of the height of the cup 20. Of course, the greater amount that the diameter of the opening 26 is below about 120% of the height of the cup 20, the more time will be required to heat the middle portion of the mixture a sufficient amount. Also in the preferred embodiment shown in FIGS. 1-4, the opening 26 of the cup 20 has a diameter of about 3.7 inches and the height of the cup 20 is about 2.8 inches. These dimensions contribute to a cup 20 that is sized to contain the mixture without spilling during microwave heating, including when either one egg is used or two eggs are used. The cup 20 is made from a material that is suitable for microwave heating, such as polypropylene, and can be made using a thermoforming process.

Immediately below the rim 28 is an upper section 30 of the sidewall 22 that is slightly outwardly tapered toward the base 24. The upper section 30 of the sidewall 22 extends between the rim 28 and an inwardly extending step 32, where the sidewall 22 transitions to a lower section that tapers inwardly toward the base 24. The step 32 and upper section 30 of one cup 20 cooperate with like parts of another cup 20 when the cups are nested together to assist with denesting during assembly of the packaged food product.

Membrane

The flexible lid or membrane 34 can be a multilayer film, which can optionally include layers of polyethylene, ethylene vinyl acetate, and polypropylene. The flexible membrane 34 can be heat sealable to the flange of the rim 28 of the cup 20, optionally in a hermetic manner. As mentioned above, the membrane 34 may have microperforations therein to accommodate pressure changes within the sealed cup, such as may arise during transportation. The membrane 34 can optionally have a tab portion 36, shown in FIG. 3, that can be grasped by a consumer to initiate removal of the membrane 34 from the cup 20.

Pouches

Figure 5:
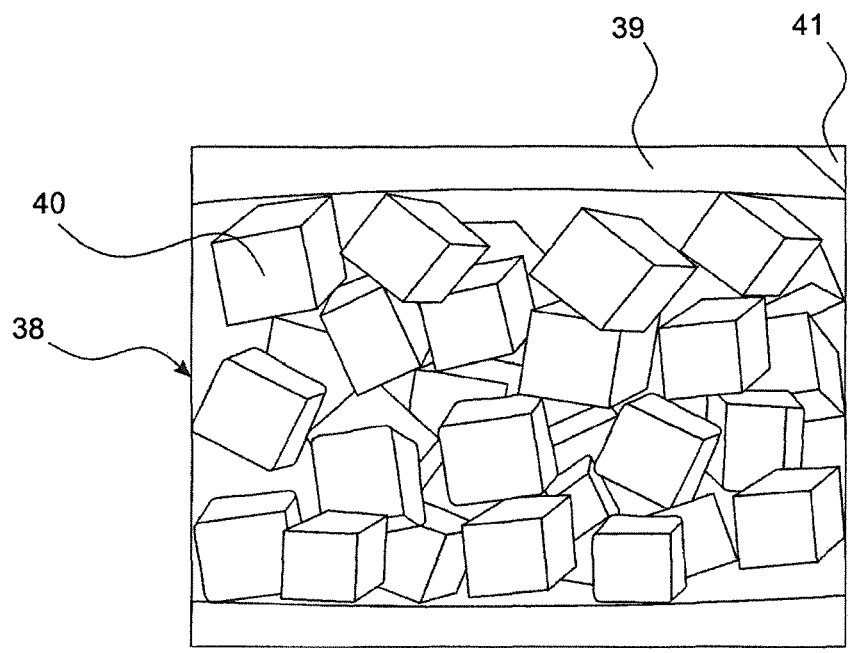
FIG. 5 is a top plan view of a first of the pouches.

The flexible pouches 38, 42, 46 are optionally formed of transparent film, and have a sealed periphery surrounding an interior containing the food products 40, 44, 48. The pouches 38, 42, 46 can optionally include a thermoformed pocket formed in a bottom sheet of film that is then filled and covered with a second sheet of film. The two films are then joined together, such as with a heat seal, about the thermoformed pocket. An unsealed region between the two films outwardly of the sealed periphery can provide an easy open feature to initiate pulling the two films apart to open the pouch. Instead of a thermoformed pocket, two films can be joined together about a food product 40 (or a single film folded over and sealed) to form the pouch 38, as shown in FIG. 5, with top and bottom seals 39 along with an unsealed starter portion 41.

With reference to FIGS. 29-31, a pouch 132 can contain pieces of a food product 134 disposed within a thermoformed pocket 124 of a bottom film 126. A seal 130 can be formed between a portion of the bottom film 126 disposed outwardly from the pocket 124 and a top film 128. An unsealed area between top film 128 and the bottom film 126 and outwardly of the seal 130 can be used to facilitate separation of the films 126, 128 to open the pouch 132.

Figure 6:
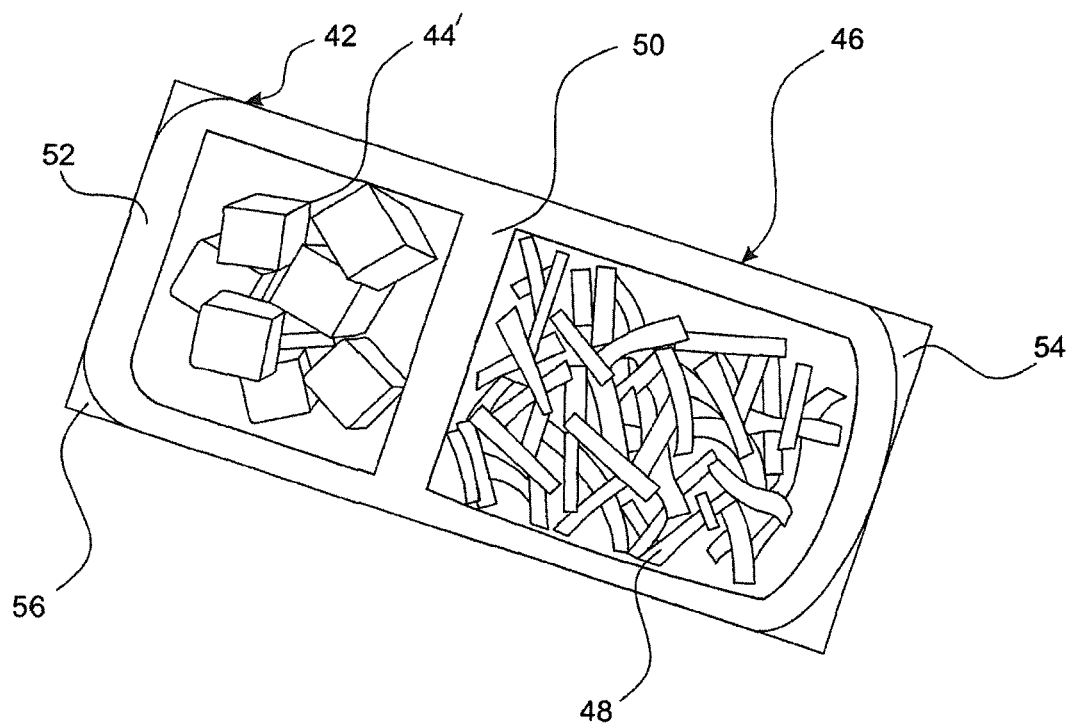
FIG. 6 is a top plan view of the second and third pouches, showing the pouches joined by an optional saddle.

Two of the pouches 42, 46 can be joined together using a saddle 50 to form a saddle pack, as shown in FIG. 6. More specifically, the bottom sheet of film can have two thermoformed pockets spaced apart, and the second sheet of film can be sealed around each of the pockets in a sealing margin 52 such that the contents of the two pouches 44', 48 are separated but the pouches 42, 46 are joined together. Unsealed areas 54, 56 outward of the sealing margin 52 can be used to facilitate opening of the respective pouches 42, 46. Such a saddle pack can advantageously reduce the number of assembly steps for the packaged food product. Specifically, instead of having to deposit two separate pouches into the interior of the cup, a single saddle pack can be used instead. Of course, other pouches can also be deposited into the interior of the cup 20 in addition to the saddle pack.

In addition to the food components, the pouches may include nitrogen or a mixture of nitrogen and carbon dioxide, e.g., 75% nitrogen, 25% carbon dioxide.

Packaged Food Product Assembly

Figure 7:
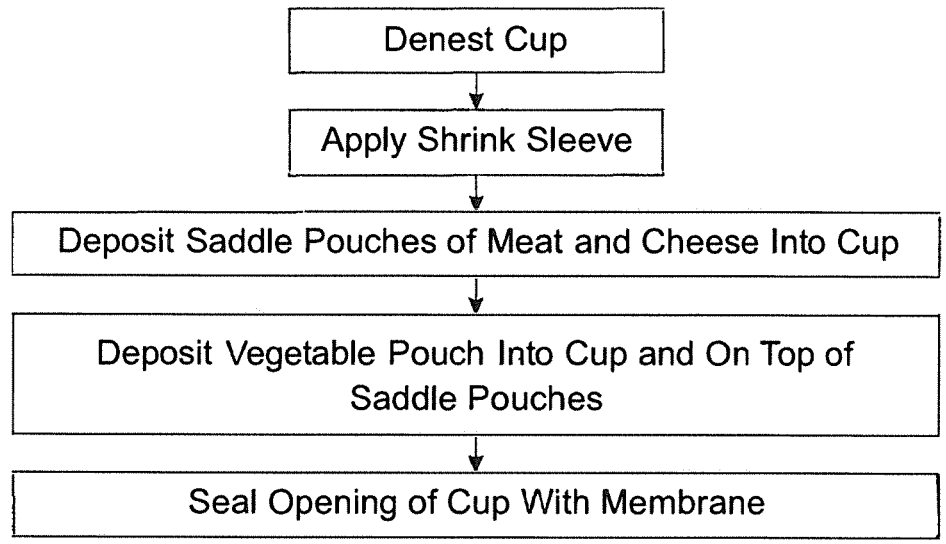
FIG. 7 is a diagram of assembly steps for the packaged food product of FIG. 1.

To assemble the packaged food product, such as using the steps shown in FIG. 7, the cup is denested from other cups, such as in a stack of cups, the cheese ingredient pouch and the meat ingredient pouch are both deposited into the interior of the cup through the opening. Next, the vegetable ingredient pouch is deposited into the interior of the cup through the opening. While the order of insertion of the pouches can be switched, it is preferred to insert the vegetable ingredient pouch after the cheese and meat ingredient pouches so that the latter can elevate the former from the base of the cup and present the former to the consumer upon opening of the membrane. The membrane is sealed to the flange of the cup, such as by using a heat seal, after the pouches have been deposited into the interior of the cup.

The invention claimed is:

1. A process for preparing packaged diced vegetable pieces, the vegetable pieces comprising potato pieces and other vegetable pieces, the process comprising:
  immersion blanching raw potato pieces having a pH of between about 5 and about 6 in an acidic media so that the pH of the potato pieces after acidification is about 4.0 to about 4.8;
  steam blanching other raw vegetable pieces which have a pH of between about 5 and about 6;
  acidifying the other vegetable pieces after blanching in an acidic media so that the pH of the other vegetable pieces after acidification is 4.0 to 4.8;
  freezing the blanched, acidified vegetable pieces using an IQF process;
  thereafter hermetically sealing the blanched, acidified, frozen vegetable pieces in flexible pouches under vacuum with a nitrogen atmosphere;
  thereafter thawing the blanched, acidified, frozen vegetable pieces in the sealed pouches in the nitrogen atmosphere; and
  thereafter subjecting the thawed vegetable pieces in the sealed pouches in the nitrogen atmosphere to high pressure processing;
  wherein the process enables freshness of the potato and vegetable pieces to be maintained in the sealed pouches at refrigerated temperatures for at least 75 days.

2. The process of claim 1 wherein the pH of the potato pieces after acidification is about 4.4 to about 4.6.

3. The process of claim 1 further comprising inserting each of the sealed pouches containing thawed vegetable pieces into a microwavable cup;
   providing a lid on the microwavable cup to provide an enclosed environment for the sealed pouches containing the thawed vegetable pieces; and
   refrigerating the microwavable cup containing the sealed pouches with the thawed vegetable pieces.

4. The process of claim 1 wherein the high pressure processing comprises subjecting the thawed vegetable pieces in the pouches in the nitrogen atmosphere to high pressure processing at about 86,500 psi for about 3 minutes at a temperature of about 41° F.

5. The process of claim 1 wherein the other vegetable pieces are acidified with acid media having a pH of between 2.0 and 3.0 comprising about 1% to about 20% citric acid in water.

6. The process of claim 1 wherein the blanched, acidified potato pieces include, in addition to the potato pieces themselves, citric acid and water, but are substantially free of other ingredients.

7. The process of claim 1 wherein acidifying the other vegetable pieces comprises conveying the other vegetable pieces through an acidification vessel by a conveyor.

8. The process of claim 1, wherein each vegetable piece has a minimum dimension greater than about ⅛ inch and a maximum dimension of less than ⅞ inch.

9. A process for preparing diced potato pieces for packaging comprising:
   immersion blanching raw potato pieces having a pH of about 5 to about 6 in a 0.1 to 5% acid media for 1 to 20 minutes so that the pH of the potato pieces after acidification is about 4.0 to about 4.8;
   sealing the acidified potato pieces in pouches in a nitrogen atmosphere; and
   subjecting the sealed pouches containing the acidified potato pieces to high pressure processing to achieve a shelf life of at least 75 days at refrigerated temperatures.

10. The process of claim 1, wherein the acidifying the other vegetable pieces comprises immersing the other vegetable pieces in the acidic media in a two-step continuous process, wherein:
    in a first acidification step, the other vegetable pieces are carried through an acidification vessel by a conveyor; and
    in a second acidification step, the other vegetable pieces are conveyed through an acidification flume to a delivery location while immersed in the acidic media.

11. The process of claim 10, wherein in the first acidification step, the dwell time in the vessel is about 2 minutes, and in the second acidification step, the duration of the other vegetable pieces in the flume is about 1 to about 3 minutes.

12. The process of claim 10, wherein the delivery location in the second acidification step comprises a conveyer shaker configured to remove any access acidic media from the other vegetable pieces prior to the subsequent freezing using the IQF process.

* * * * *